(12) United States Patent
Schimossek et al.

(10) Patent No.: US 10,385,288 B1
(45) Date of Patent: Aug. 20, 2019

(54) GRAFT COPOLYMERS BASED ON POLYOLEFIN BACKBONE AND METHACRYLATE SIDE CHAINS

(71) Applicants: Evonik Oil Additives GmbH, Darmstadt (DE); Regents of the University of Minnesota, Minneapolis, MN (US)

(72) Inventors: Klaus Schimossek, Bensheim (DE); Katrin Schoeller, Darmstadt (DE); Mohammad T. Savoji, St. Paul, MN (US); Marc A. Hillmyer, Minneapolis, MN (US); Timothy P. Lodge, Minneapolis, MN (US)

(73) Assignees: Evonik Oil Additives GmbH, Darmstadt (DE); Regents of the University of Minnesota, Minneapolis, MN (US)

( * ) Notice: Subject to any disclaimer, the term of this patent is extended or adjusted under 35 U.S.C. 154(b) by 0 days.

(21) Appl. No.: 16/300,639

(22) PCT Filed: May 11, 2017

(86) PCT No.: PCT/EP2017/061281
§ 371 (c)(1),
(2) Date: Nov. 12, 2018

(87) PCT Pub. No.: WO2017/194654
PCT Pub. Date: Nov. 16, 2017

Related U.S. Application Data

(60) Provisional application No. 62/335,898, filed on May 13, 2016.

(51) Int. Cl.
*C10M 145/14* (2006.01)
*C08F 277/00* (2006.01)
(Continued)

(52) U.S. Cl.
CPC ......... *C10M 145/14* (2013.01); *C08F 255/08* (2013.01); *C08F 277/00* (2013.01);
(Continued)

(58) Field of Classification Search
CPC ... C08F 255/08; C08F 277/00; C10M 145/14; C10M 169/041; C10M 2203/003;
(Continued)

(56) References Cited

U.S. PATENT DOCUMENTS 3,702,300 A    11/1972  Coleman
4,788,361 A    11/1988  Olson et al.
(Continued)

FOREIGN PATENT DOCUMENTS

DE    196 31 170    2/1998
EP    0 668 342    8/1999
(Continued)

OTHER PUBLICATIONS

Xu, Y., Thurber, C.M., Lodge, T.P., Hillmyer, M.A., Synthesis and Remarkable Efficacy of Model Polyethylene-graft-poly(methyl methacrylate) COpolymers as Compatibilizers in Polyethylene/Poly(methyl methacrylate) Blends, Macromolecules, 2012, 45, 9604-9610 (Year: 2012).*

(Continued)

*Primary Examiner* — James C Goloboy
(74) *Attorney, Agent, or Firm* — Grüneberg and Myers PLLC

(57) ABSTRACT

A graft copolymer can include, in its backbone, at least one segment having repeating units obtainable by ring-opening metathesis polymerization (ROMP) of an optionally substituted cycloalkene, and at least one segment comprising repeating units obtainable by atom transfer radical polymerization (ATRP) of a (meth)acrylate. The corresponding graft copolymer is highly suitable for use as an oil additive (Continued)

Relative thickening contribution (RTC) of graft copolymers P1-P3 in internal combustion engines, in particular, in combustion engines which are operated for longer periods of time at substantially constant operating temperatures.

19 Claims, 6 Drawing Sheets

(51) Int. Cl.
 *C10M 169/04* (2006.01)
 *C08F 255/08* (2006.01)
(52) U.S. Cl.
 CPC .. *C10M 169/041* (2013.01); *C10M 2203/003* (2013.01); *C10M 2209/084* (2013.01); *C10N 2220/021* (2013.01); *C10N 2220/022* (2013.01); *C10N 2230/02* (2013.01); *C10N 2240/10* (2013.01)
(58) Field of Classification Search
 CPC ....... C10M 2209/084; C10N 2220/021; C10N 2220/022; C10N 2230/02; C10N 2240/10
 See application file for complete search history.

(56) References Cited

U.S. PATENT DOCUMENTS

| | | | |
|---|---|---|---|
| 5,002,676 | A | 3/1991 | Willis et al. |
| 5,460,739 | A | 10/1995 | Rhodes et al. |
| 5,565,130 | A | 10/1996 | Omeis et al. |
| 5,597,871 | A | 1/1997 | Auschra et al. |
| 5,625,005 | A | 4/1997 | Mallya et al. |
| 5,756,433 | A | 5/1998 | Auschra et al. |
| 6,599,864 | B1 | 7/2003 | Bertomeu |
| 8,067,349 | B2 | 11/2011 | Stoehr et al. |
| 2010/0190671 | A1 | 7/2010 | Stoehr et al. |
| 2011/0230378 | A1 | 9/2011 | Schimmel et al. |

FOREIGN PATENT DOCUMENTS

| | | |
|---|---|---|
| EP | 0 955 320 | 11/1999 |
| EP | 0 699 694 | 1/2000 |
| EP | 0 969 077 | 1/2000 |
| EP | 0 637 332 | 5/2003 |
| EP | 0 744 457 | 9/2003 |
| EP | 0 621 293 | 6/2004 |
| EP | 0 979 834 | 7/2004 |
| EP | 0 937 769 | 8/2004 |
| EP | 0 776 959 | 10/2004 |
| EP | 1 029 029 | 6/2013 |
| EP | 2 152 801 | 6/2013 |
| WO | 96/30421 | 10/1996 |
| WO | 97/18247 | 5/1997 |
| WO | 97/21788 | 6/1997 |
| WO | 97/47661 | 12/1997 |
| WO | 98/40415 | 9/1998 |
| WO | 99/10387 | 3/1999 |
| WO | 99/41332 | 8/1999 |
| WO | 00/08115 | 2/2000 |
| WO | 00/14179 | 3/2000 |
| WO | 00/14183 | 3/2000 |
| WO | 00/14187 | 3/2000 |
| WO | 00/14188 | 3/2000 |
| WO | 00/15736 | 3/2000 |
| WO | 01/18156 | 3/2001 |
| WO | 01/57166 | 8/2001 |
| WO | 2006/084698 A2 | 8/2006 |
| WO | 2014/135628 | 9/2014 |

OTHER PUBLICATIONS

Xu, G., Wang, D., Buchmeiser, M.R., "Functional Polyolefins: Poly(ethylene)-graft-Poly(tert-butyl acrylate) via Atom Transfer Radical Polymerization From a Polybrominated Alkane", Macromol. Rapid Commun., 2012, 33, 75-79 (Year: 2012).*
International Search Report dated Aug. 10, 2017 in PCT/EP2017/061281.
Written Opinion dated Aug. 10, 2017 in PCT/EP2017/061281.
Xu et al., "*Functional Polyolefins: Poly(ethylene)-graft-Poly(tert-butyl acrylate)via Atom Transfer Radical Polymerization From a Polybrominated Alkane*," Macromolecular Rapid Communications, 2012, 33, 75-79 DOI: 10.1002/marc.201100521.
Xu et al., "*Synthesis and Remarkable Efficacy of Model Polyethylent-graft-poly(methyl methacrylate)Copolymers as Compatibilizers in Polyethylene/Poly(methyl methacrylate)Blends*," Macromolecules, 2012, 45, 9604-9610 dx.doi.org/10.1021.ma302187b.

* cited by examiner

Figure 1: Relative thickening contribution (RTC) of graft copolymers P1-P3
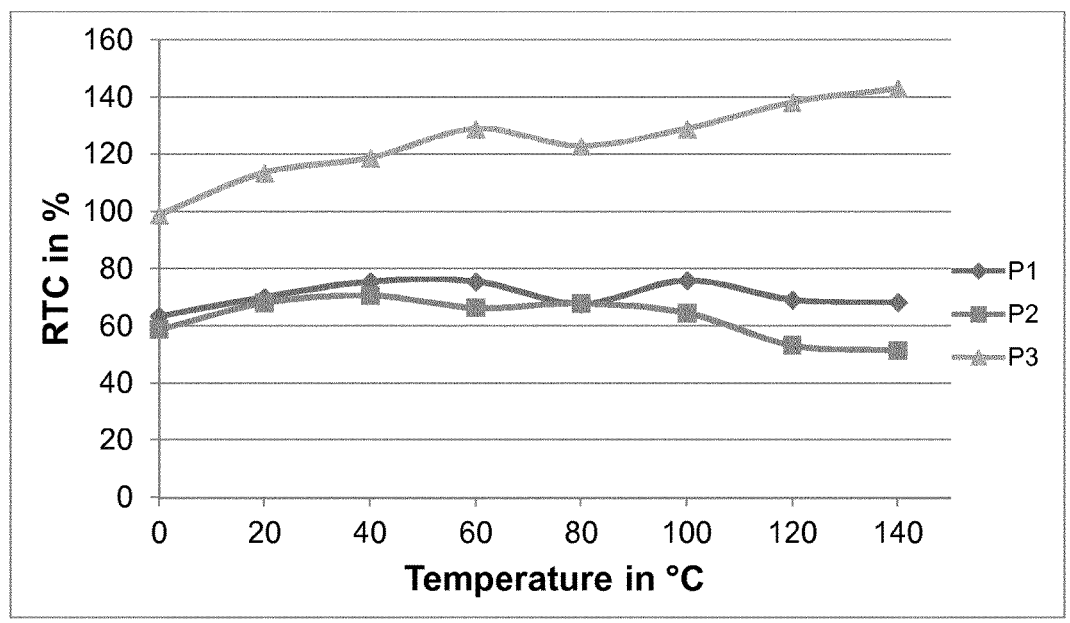

Figure 2: Viscosity-temperature behavior of lubricant compositions comprising the graft copolymer P3 with different treat rates
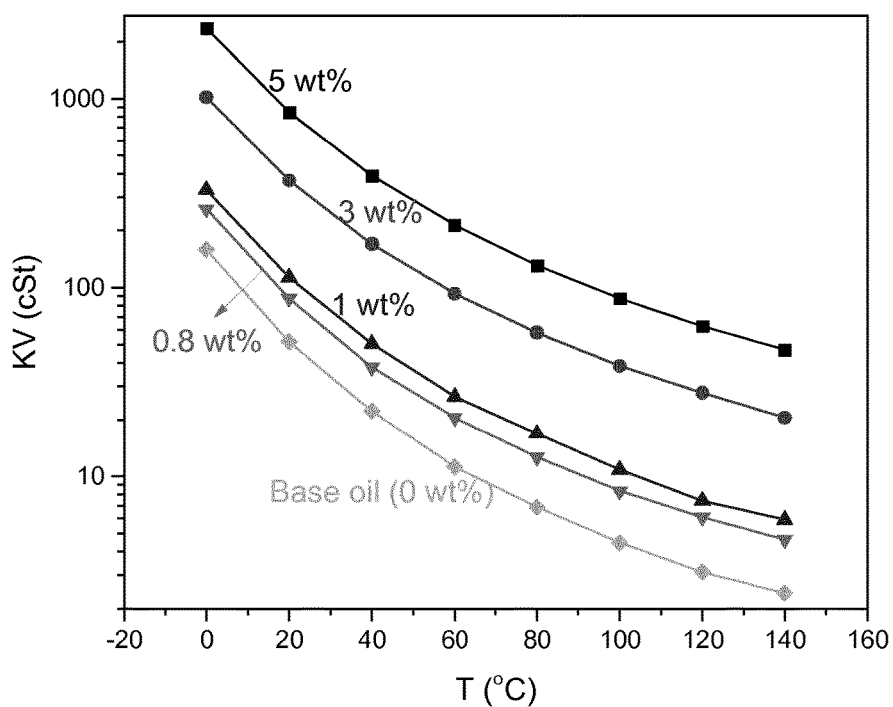

Figure 3: Viscosity-temperature behavior of lubricant compositions comprising the graft copolymers P1-P3
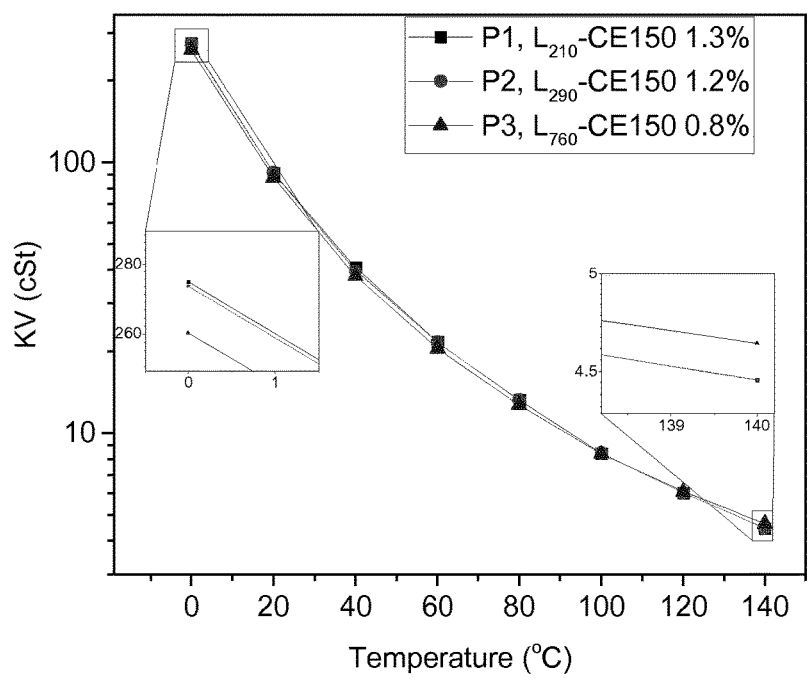

Figure 4: Viscosity-temperature behavior of lubricant compositions comprising the graft copolymers P3-P5
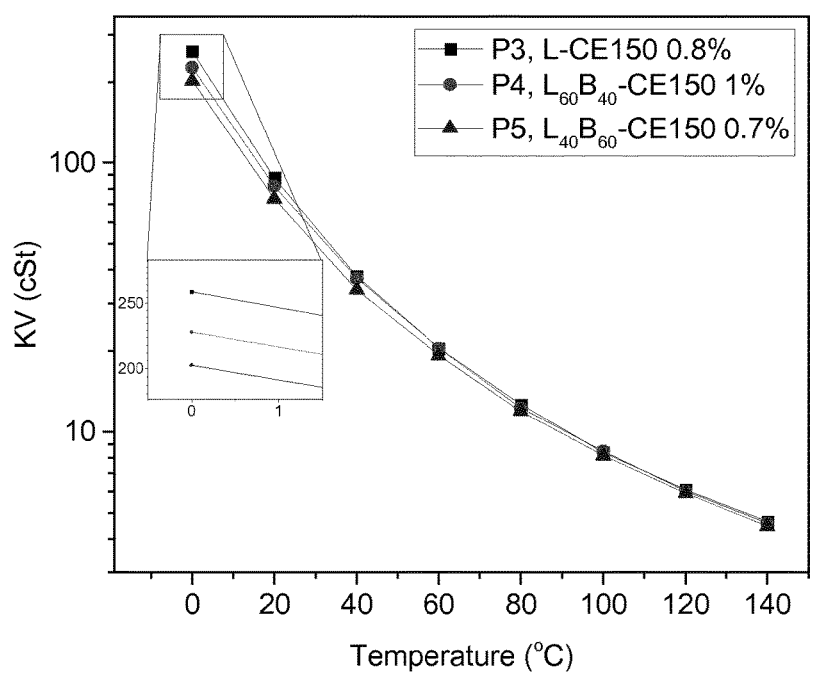

Figure 5: Viscosity-temperature behavior of lubricant compositions comprising the graft copolymers P7-P9
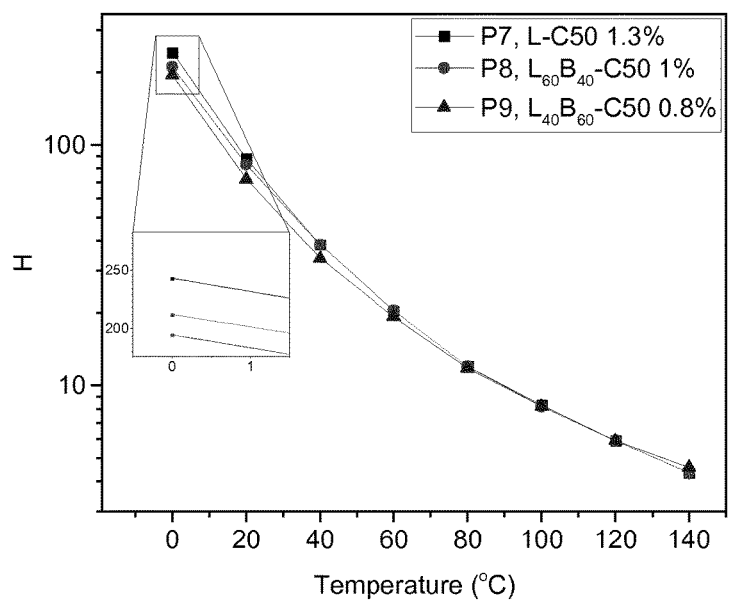

Figure 6: Flow curve of the lubricant composition comprising 5 wt.% of the graft copolymer P3 at 40°C and 100°C
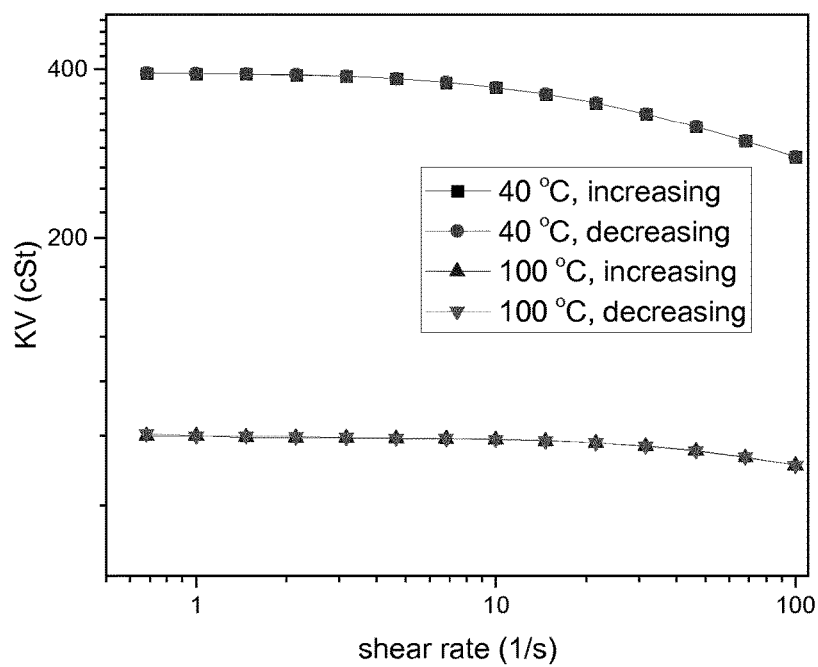

GRAFT COPOLYMERS BASED ON POLYOLEFIN BACKBONE AND METHACRYLATE SIDE CHAINS

This application is the National Stage entry under § 371 of International Application No. PCT/EP2017/061281, filed on May 11, 2017, and which claims the benefit of U.S. Provisional Application No. 62/335,898, filed on May 13, 2016.

The present application relates to oil-soluble graft copolymers, a process for their preparation and use as viscosity index improvers.

STATE OF THE ART

Poly(alkyl (meth)acrylates) (PAMAs) which are generally synthesized by simple free-radical copolymerization of a mixture of different alkyl methacrylates (AMAs) are commonly employed as oil additives. Depending on their molecular weight and composition, their use allows an increase of the viscosity index (VI) (cf. R. M. Mortier, S. T. Orszulik (eds.), Chemistry and Technology of Lubricants, Blackie Academic & Professional, 1st ed., London 1993, 124-159 & 165-167). The VI of PAMA-treated lubricants can frequently be raised by copolymerizing short-chain alkyl (meth)acrylates, for example methyl methacrylate or butyl methacrylate (cf. EP0637332, EP0937769 or EP0979834). However, the presence of short-chain component commonly lowers the polymer solubility in oil at low temperatures, so that the content of methyl methacrylate in the PAMA is usually restricted to about 25% by weight. These polymers, depending on concentration, permanent shear stability index (PSSI) and the base oil type, usually have a VI in the range between 150 and 250.

A further class of viscosity index improvers (VII) are styrene-alkyl maleate copolymers which are obtained by polymer-analogous esterification of styrene-maleic anhydride copolymers with typically C6-C24 alcohols. The esterification is driven up to a conversion of about 95% by addition of butanol. A complete conversion of the acid functionalities is possible by adding an amine to form amidic or imidic groups (U.S. Pat. No. 3,702,300, EP0969077).

The viscosity of polymer solutions in mineral oils or synthetic oils largely depends on the molecular weight of the polymer. Also, temperature dependence of the viscosity decreases or the viscosity index (VI) increases by increasing molecular weight (J. Bartz, Additive für Schmierstoffe [Additives for Lubricants], Expert-Verlag, Renningen-Malmsheim 1994, 197-252).

In parallel to the molecular weight, the shear stability, however, decreases due to chain breakage under high shear. As a result of this effect, shear-stable VIIs, as required for manual transmission oils, automatic transmission oils, hydraulic oils or motor oils, based on conventional polymer types such as PAMAs need to comprise relatively large amounts of the polymer. It is therefore highly desirable to develop VIIs having a low contribution to viscosity at low temperatures, normal thickening in the VI range from 40 to 100° C., high contribution to viscosity above 100° C. and a good oil solubility within the entire temperature range.

In addition to the above-mentioned linear polymers such as the PAMAs, VIIs based on comb polymers are also known. EP0744457 describes comb polymers based purely on PAMA, in which the side arms themselves consist of oligomeric PAMA. In addition, comb polymers in which the side chains consist of saturated or hydrogenated polyolefins and the backbone of short-chain monomers such as AMAs or alkylstyrenes are known. For instance, EP 0 621 293 describes comb polymers in which the side chains are formed from hydrogenated polybutadiene. Similarly, EP0699694 relates to comb polymers with side arms based on saturated olefin segments, for example polyisobutylene or atactic polypropylene.

A-B-A triblock copolymers based purely on PAMA (P. Callais, S. Schmidt, N. Macy, SAE Technical Paper Series, No. 2004-01-3047) and those based on a polybutyl methacrylate core and hydrogenated polybutadiene or polyisoprene arms (U.S. Pat. No. 5,002,676) have already been described as VIIs. Anionically prepared A-B-A block copolymers with a polystyrene core and, for example, hydrogenated polyisoprene arms even found commercial use as VIIs (U.S. Pat. No. 4,788,361). Such VIIs are also assigned to the class of the hydrogenated styrene-diene copolymers.

In addition to the above-described application as VIIs, comb polymers with hydrogenated or saturated side arms are also used in other applications. For instance, DE19631170 describes comb polymers for impact-resistant molding materials, the polymers being a sequence of polyisobutylene-containing macromonomers without additional short-chain branches on the backbone. Functionalized polypropylene with high molar mass (up to 300 000 g/mol) was also attached to a styrene-maleic anhydride backbone to form a soft comb polymer gel with high insulating properties (EP0955320). In one example from the chemistry of adhesives, U.S. Pat. No. 5,625,005 describes comb polymers with hydrogenated polybutadiene or isoprene arms and with acrylic acid and AMAs-based backbone.

U.S. Pat. Nos. 5,565,130 and 5,597,871 disclose use of comb polymers based, for example, on polybutadiene as viscosity index improvers.

U.S. Pat. No. 8,067,349 describes oil-soluble graft copolymers based on polyolefin-based macromonomers, especially polybutadiene-based methacrylic esters, and $C_{1-10}$ alkyl methacrylates. The comb polymers can be used as an additive for lubricant oils, in order to improve the viscosity index and shear stability.

US 2010/0190671 is related to the use of comb polymers for reducing fuel consumption. The comb polymers disclosed therein comprise, in the backbone, at least one repeating unit which is obtained from at least one polyolefin-based macromonomer, and at least one repeating unit which is obtained from at least one low molecular weight monomer selected from the group consisting of styrene monomers having 8 to 17 carbon atoms, alkyl(meth)acrylates having 1 to 10 carbon atoms in the alcohol group, vinyl esters having from 1 to 11 carbon atoms in the acyl group, vinyl ethers having 1 to 10 carbon atoms in the alcohol group, (di)alkyl fumarates having 1 to 10 carbon atoms in the alcohol group, (di)alkyl maleates having 1 to 10 carbon atoms in the alcohol group and mixtures thereof, where the molar degree of branching is in the range of 0.1 to 10 mol % and the comb polymer comprises a total of at least 80% by weight, based on the total weight of repeating units of the comb polymer, of at least one repeating unit which is obtained from at least one polyolefin-based macromonomer and at least one repeating unit which is obtained from at least one low molecular weight monomer.

WO 2014/135628 is directed to the use of a comb polymer for reducing the loss in viscosity at 100° C. of a lubricant composition for the crankcase of an internal combustion engine, wherein the internal combustion engine is fuelled with a fuel composition which comprises a fatty acid alkyl ester. The comb polymers used therein comprise, in the main chain, at least one repeat unit which is obtained from at least one polyolefin-based macromonomer, and at least one repeat unit which is obtained from at least one low molecular weight monomer. While the side chain has very high proportions of olefinic repeat units, especially units which are derived from alkenes or alkadienes, for example ethylene, propylene, n-butene, isobutene, butadiene, isoprene, the main chain comprises relatively large proportions of polar unsaturated monomers.

For engine oil application, a blend of conventional PAMAs and olefin copolymer (OCPs) VIIs is also known. As VIIs, both PAMAs and OCPs have advantages and disadvantages. OCPs have an excellent thickening action but no appreciable pour point depressant effect, while PAMA impart to mineral oils a good viscosity/temperature behavior and, when sufficiently concentrated, excellent wear protection. This gave rise to an idea of combining products of both classes of polymers, in order to produce lubricating oil additives with improved properties. Research for producing a stable mixture of PAMA and OCP in a liquid (oil-based) form with the highest possible polymer content was initiated in the early 1980s. No noticeable difficulties arise as long as less than 5% of polymer of one class is combined with a predominant proportion of the other class. However, when a concentrated PAMA solution (30 to 70% by weight) in a mineral oil is admixed with a concentrated OCP solution (8 to 12% by weight) at a higher concentration, a phase separation of the polymers takes place which, during a long storage, can lead to a layer formation. To prevent such phase separation phenomena, which makes the mixture useless for most processing, polymer emulsions comprising polymethacrylates and olefinic copolymers in liquid vehicles were developed. They retain the characteristics of the existing disperse system when subsequently diluted to a polymer content of as low as about 10%. Patents describing the grafting of PAMAs on OCPs also exist, such as EP2152801B1.

In addition, several patent applications describing grafting of dispersant segments on OCPs like WO 2006/084698 A2 have been published. None of them describe a comb polymer with an inverse structure compared to U.S. Pat. No. 8,067,349B2, i.e. olefin backbone and PAMA side arms.

PAMA with narrow molecular weight distribution can also be prepared by other controlled radical polymerization (CRP) techniques, such as nitroxide-mediated polymerization (NMP), atom transfer radical polymerization (ATRP), and reversible addition-fragmentation chain transfer (RAFT) polymerization. In particular, RAFT and ATRP have been used to develop star-shaped PAMAs. These star-shaped structures are reported to have enhanced thickening efficiency/shear stability and VI contribution relative to the conventional linear polymers.

Star polymers based on hydrogenated polystyrene-butadiene polymers or styrene-butadiene-isoprene system exist for quite some time under brand name Shellvis (U.S. Pat. No. 5,460,739A).

Technical Problem

The polymers described above are being commercially used for a broad range of applications. Nevertheless, there is an ongoing effort to develop novel viscosity improving polymers which have an improved thickening efficiency (TE) for use in multigrade engine oils. When formulated to a given high temperature high shear (HTHS) at 150° C. (HTHS150), the kinematic viscosity (KV) at 100° C. (KV100) of a lubricant formulated with comb polymers should be sufficiently high to keep the engine parts protected. At the same time, the viscosity Index (VI) of the polymers should be as high as possible to keep the kinematic viscosity at 40° C. (KV40) reasonably low for the sake of fuel economy at low temperatures. The improved thickening efficiency would result in a lower treat rate and in an economical benefit.

A further object of the invention was to provide a manufacturing process for the production of said comb polymers from commercially available starting materials. Ideally, such manufacturing process should be suitable for an industrial scale without a need for novel production plants or sophisticated equipment.

A further object of the present invention was to provide a lubricant, preferably a lubricant oil, having an improved profile of properties. Such lubricant oil would be highly suitable for use in internal combustion engines, particularly in engines working for longer periods of time at substantially constant operating temperatures. Under these conditions, a sufficiently high KV100 becomes particularly important, so that an adequate protection of the combustion engine is ensured.

Inventive Solution

The present invention is based on a surprising finding that a graft copolymer comprising at least one segment having repeating units obtainable by ring-opening metathesis polymerization (ROMP) of an optionally substituted cycloalkene in the backbone and at least one segment comprising repeating units obtainable by atom transfer radical polymerization (ATRP) of a (meth)acrylate in the side chain has an excellent thickening efficiency, high viscosity index and a high kinematic viscosity at 100° C. (KV100). Therefore, the corresponding graft copolymer is highly suitable for use as an oil additive in internal combustion engines, in particular, in combustion engines which are operated for longer periods of time at substantially constant operating temperatures.

BRIEF DESCRIPTION OF FIGURES

FIG. 1: Relative thickening contribution (RTC) of graft copolymers P1-P3.

FIG. 2: Viscosity-temperature behavior of lubricant compositions comprising the graft copolymer P3 with different treat rates.

FIG. 3: Viscosity-temperature behavior of lubricant compositions comprising the graft copolymers P1-P3.

FIG. 4: Viscosity-temperature behavior of lubricant compositions comprising the graft copolymers P3-P5.

FIG. 5: Viscosity-temperature behavior of lubricant compositions comprising the graft copolymers P7-P9.

FIG. 6: Flow curve of the lubricant composition comprising 5 wt. % of the graft copolymer P3 at 40° C. and 100° C.

GRAFT COPOLYMER OF THE PRESENT INVENTION

One aspect of the present invention is related to a graft copolymer comprising at least one segment A in the backbone and at least one segment B in the side chain, wherein the segment A comprises repeating units obtainable by ROMP of at least one compound represented by Formula (I):

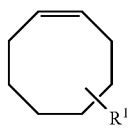

wherein $R^1$ is a hydrogen atom or an optionally substituted hydrocarbon group having 1 to 40 carbon atoms, and at least one ATRP initiator bearing an optionally substituted cycloalkenyl substituent; and the segment B comprises repeating units obtainable by ATRP of at least one compound represented by Formula (II):

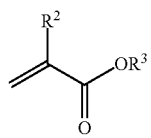

wherein $R^2$ is a hydrogen atom or a methyl group, and $R^3$ is an optionally substituted hydrocarbon group having 2 to 40 carbon atoms.

If not specified otherwise, the technical terms in the present application are used in their common meaning, as defined e.g. in the IUPAC recommendations 1996 (Pure & Appl. Chem., Vol. 68, No. 12, pp. 2287-2311, 1996), the entire disclosure of which is incorporated herein by reference.

The graft copolymer of the present invention is a macromolecule comprising a backbone with multiple trifunctional branch points from each of which a linear side chain emanates. The backbone of the graft copolymer is a chain to which the side chains are being pendant. Graft copolymer as described in the present application are sometimes also called "comb copolymer". Hence, both terms are used synonymously in the present application.

The term "backbone" as used herein does not necessarily mean that the chain length of the backbone is greater than that of the side chains. Instead, this term relates to the composition of this chain. According to the present invention, the side chain typically has a high proportion of repeating units derived from optionally substituted alkyl (meth)acrylates, more preferably repeating units derived from alkyl methacrylates. Preferably, the segment B forms the side chain of the graft copolymer.

The backbone typically comprises a relatively large proportion of repeating units derived from optionally substituted cycloalkenes. Preferably, the segment A forms the backbone of the graft copolymer.

As a result of high proportion of repeating units derived from optionally substituted cycloalkenes, the segment A may be regarded as a nonpolar segment. Due to the presence of a high proportion of repeating units derived from optionally substituted alkyl (meth)acrylates, the segment B may be regarded as a polar segment. Typically, the polar segment has a higher polarity than the nonpolar segment.

The term "segment" in this context denotes a section of the graft copolymer. The segments may have an essentially constant composition composed of one or more monomeric units. In addition, the segments may have a gradient, in which case the concentration of different repeating units varies over the segment length. If two or more different repeating units are present within a segment, said repeating units may be arranged randomly or as block copolymers.

The term "repeating unit" is well-known to a person skilled in the art. The segment A of the graft copolymer of the present invention can be obtained by a process which involves ROMP of at least one compound represented by Formula (I) and at least one ATRP initiator bearing an optionally substituted cycloalkenyl substituent. Accordingly, the repeating units of the segment. A arise from the compound of Formula (I) and the atom transfer radical polymerization initiator.

According to the present invention, the segment A comprises repeating units obtainable from at least one compound represented by Formula (I). Typically, the segment A comprises at least 50% by weight, more preferably at least 65% by weight, even more preferably at least 75% by weight and most preferably at least 90% by weight of one or several compounds represented by Formula (I), based on the weight of the segment A. In a particularly preferred embodiment, the segment A substantially consists of repeating units obtainable from at least one compound represented by Formula (I).

The segment B of the graft copolymer of the present invention is obtainable by ATRP of an optionally substituted alkyl (meth)acrylate represented by Formula (II). Hence, the repeating units of the segment B are at least largely derived from the compound of Formula (II). In a particularly preferred embodiment, the segment B substantially consists of repeating units obtainable from at least one compound represented by Formula (II).

The number of segments B in the graft copolymer is typically at least 5, more preferably, at least 10, even more preferably, at least 20. This ensures that the viscosity index of the graft copolymer is sufficiently high. On the other hand, if the number of segments B, i.e. the number of side chains, is too high, the contracted coil formation of the copolymer backbone at low temperatures becomes more difficult and the VI improving properties are lowered. For this reason, the number of segments B is preferably below 200, more preferably below 150, particularly preferably below 100. In summary, from the viewpoint of optimal overall performance of the graft copolymer, the number of segments B is preferably kept from 5 to 200, more preferably from 10 to 150, yet even more preferably from 20 to 100.

For achieving an optimal viscosity index of the graft copolymer, it is further desired that the number of repeating units derived from the compound represented by Formula (I) is at least 100, more preferably at least 200, yet even more preferably at least 300. Ideally, the number of repeating units derived from the compound represented by Formula (I) is chosen in the range from 100 to 1 500, preferably from 200 to 1 200, more preferably from 300 to 1 000.

Without wishing to be bound by a theory, applicants believe that for the sake of achieving an optimal thickening efficiency, the molecular weight of the backbone is preferably chosen to be from 50 000 g/mol to 300 000 g/mol.

Depending on the nature of the substituent $R^3$, the side chains of the graft copolymer are relatively polar, i.e. are more polar than the backbone. Therefore, the polarity of the entire graft copolymer increases with the increasing number of repeating units derived from the compound represented by Formula (II) within a single side chain.

Generally, the viscosity index of the graft copolymer as well as its thickening efficiency increases with the increasing number of repeating units derived from the compound represented by Formula (II) within a single side chain. Therefore, the number of repeating units derived from the compound represented by Formula (II) within a single side chain is typically at least 100, preferably at least 500, even more preferably at least 700. To achieve an optimal overall performance of the graft copolymer, the number of repeating units derived from the compound represented by Formula (II) within a single side chain is selected to be from 100 to 1 500, preferably from 500 to 1 200, yet even more preferably from 700 to 1 000.

Accordingly, the average molecular weight Mn of individual side chains of the graft copolymer is usually below 1 000 000 g/mol, preferably below 700 000 g/mol, particularly preferably below 450 000 g/mol and even more preferably below 350 000 g/mol. The average molecular weight Mn of individual side chains of the graft copolymer is usually higher than 20 000 g/mol, preferably above 50 000 g/mol.

To achieve an optimal overall performance of the graft copolymer, the average molecular weight Mn of each single side chain of the graft copolymer is in the range of 20 000 g/mol to 1 000 000 g/mol, preferably 50 000 g/mol to 700 000 g/mol, more preferably in the range of 50 000 g/mol to 350 000 g/mol.

Nevertheless, graft copolymers having molecular weight Mn of individual side chains above 50 000 g/mol are suitable for use as viscosity index improvers.

The overall performance of the graft copolymer of the present invention as an engine oil additive is particularly advantageous if the ratio (number of segments B):(number of repeating unit derived from the compound represented by Formula (I)) is chosen in the range from 1:5 to 1:20, preferably from 1:8 to 1:15, even more preferably from 1:10 to 1:14.

The term "ring-opening metathesis polymerization" (ROMP) is used in its common technical meaning and refers to olefin metathesis, where at least one compound represented by Formula (I) and at least one ATRP initiator are polymerized in the presence of a transition metal catalyst. Olefin metathesis as such is well-known to a skilled person and is described e.g. in the review article "Metathesis" by L. Delaude and A. F. Noels, Kirk-Othmer Encyclopedia of Chemical Technology, the disclosure of which is incorporated herein by reference.

The atom transfer radical polymerization (ATRP) process is known per se. It is assumed that this is a "living" free-radical polymerization, without any intention that this should restrict the description of the mechanism. In the ATRP processes, a transition metal compound is reacted with an ATRP initiator compound which has a transferable atom group. This transfers the transferable atom group to the transition metal compound, which oxidizes the metal. This reaction forms a radical which adds onto ethylenic groups. However, the transfer of the atom group to the transition metal compound is reversible, so that the atom group is transferred back to the growing polymer chain, which forms a controlled polymerization system. The structure of the polymer, the molecular weight and the molecular weight distribution can be controlled correspondingly.

ATRP is described, for example, by J-S. Wang, et al., J. Am. Chem. Soc., Vol. 117, p. 5614-5615 (1995), by Matyjaszewski, Macromolecules, Vol. 28, p. 7901-7910 (1995). In addition, the patent applications WO 96/30421, WO 97/47661, WO 97/18247, WO 98/40415 and WO 99/10387, disclose several variants of ATRP.

As will be readily appreciated by skilled person, an ATRP initiator is typically a compound having a halogen atom as a transferable atom group. The halogen atom may be a fluorine atom, a chlorine atom, a bromine atom or an iodine atom. The halogen atom in the ATRP initiator is typically a bromine atom. Preferably, the ATRP initiator is an unsaturated alicyclic compound bearing a halogen atom, preferably a bromine atom. In a particularly preferred embodiment, the ATRP initiator is a derivative of α-bromo-isobutyric acid, more preferably an ester of α-bromo-isobutyric acid with an alcohol comprising an unsaturated alicyclic moiety.

The expression "optionally substituted hydrocarbon group" denotes a hydrocarbyl substituent. Similar definitions apply for corresponding terms. It encompasses aromatic, and alkyl, cycloalkyl, alkoxy, cycloalkoxy, alkenyl, alkanoyl, alkoxycarbonyl groups, and also heteroaliphatic groups. The groups mentioned may be branched or unbranched. In addition, these groups may have one or several substituents. Substituents are, for example, linear and branched alkyl groups having 1 to 6 carbon atoms, for example methyl, ethyl, propyl, butyl, pentyl, 2-methylbutyl or hexyl; cycloalkyl groups, for example cyclopentyl and cyclohexyl; aromatic groups such as phenyl or naphthyl; amino groups, hydroxyl groups, ether groups, ester groups and halides.

The preferred alkyl groups include the methyl, ethyl, propyl, isopropyl, 1-butyl, 2-butyl, 2-methyl-propyl, tert-butyl, pentyl, 2-methylbutyl, 1,1-dimethylpropyl, hexyl, heptyl, octyl, 1,1,3,3-tetramethylbutyl, nonyl, 1-decyl, 2-decyl, undecyl, dodecyl, pentadecyl and the eicosyl group.

The preferred cycloalkyl groups include the cyclopropyl, cyclobutyl, cyclopentyl, cyclohexyl, cycloheptyl and the cyclooctyl group, each of which may be optionally substituted with branched or unbranched alkyl groups.

The preferred alkanoyl groups include the formyl, acetyl, propionyl, 2-methylpropionyl, butyryl, valeroyl, pivaloyl, hexanoyl, decanoyl and the dodecanoyl group.

Aromatic groups preferred in accordance with the invention derive from benzene, naphthalene, biphenyl, diphenyl ether, each of which may also optionally be substituted.

The preferred alkoxycarbonyl groups include the methoxycarbonyl, ethoxycarbonyl, propoxycarbonyl, butoxycarbonyl, tert-butoxycarbonyl group, hexyloxycarbonyl, 2-methylhexyl-oxycarbonyl, decyloxycarbonyl or dodecyloxycarbonyl group.

The preferred alkoxy groups include alkoxy groups whose hydrocarbon radical is one of the aforementioned preferred alkyl groups.

The preferred cycloalkoxy groups include cycloalkoxy groups whose hydrocarbon substituent is one of the aforementioned preferred cycloalkyl groups.

The preferred cycloalkenyl groups includes cyclopentenyl, cyclohexenyl, cycloheptenyl, cyclooctenyl, cyclononenyl, cyclodecanyl, cycloundecanyl and cyclododecanyl groups.

According to the present invention, the segment B comprises repeating units obtainable from at least one compound represented by Formula (II). The compound of Formula (II) is an ester of (meth)acrylic acid. Typically, the segment B comprises at least 50% by weight, more preferably at least 65% by weight, even more preferably at least 75% by weight and most preferably at least 90% by weight of one or several compounds represented by Formula (II), based on the weight of the segment B.

The term "(meth)acrylic acid" refers to acrylic acid, methacrylic acid and mixtures of acrylic acid and methacrylic acid; methacrylic acid being preferred. Accordingly, the term "(meth)acrylates" refers to esters of acrylic acid, esters of methacrylic acid or mixtures of esters of acrylic acid and methacrylic acid; esters of methacrylic acid being preferred.

Typically, the segment B comprises more than one type of (meth)acrylate i.e. more than one compound represented by Formula (II) as a repeating unit. The compounds represented by Formula (II) are usually esters of methacrylic acids with a linear or branched alcohol having 2 to 30 carbon atoms, preferably 4 to 20 carbon atoms, more preferably, 10 to 20 carbon atoms, and particularly preferably 12 to 14 carbon atoms. The corresponding C2 to C30 alkyl (meth)acrylates include, for example, pentyl (meth)acrylate, hexyl (meth)acrylate, 2-ethylhexyl (meth)acrylate, heptyl (meth)acrylate, 2-tert-butylheptyl (meth)acrylate, octyl (meth)acrylate, 3-isopropylheptyl (meth)acrylate, nonyl (meth)acrylate, decyl (meth)acrylate, undecyl (meth)acrylate, 5-methylundecyl (meth)acrylate, dodecyl (meth)acrylate, 2-methyldodecyl (meth)acrylate, tridecyl (meth)acrylate, 5-methyltridecyl (meth)acrylate, tetradecyl (meth)acrylate, pentadecyl (meth)acrylate, hexadecyl (meth)acrylate, 2-methyl hexadecyl (meth)acrylate, heptadecyl (meth)acrylate, 5-isopropylheptadecyl (meth)acrylate, 4-tert-butyloctadecyl (meth)acrylate, 5-ethyloctadecyl (meth)acrylate, 3-isopropyloctadecyl (meth)acrylate, octadecyl (meth)acrylate, nonadecyl (meth)acrylate, eicosyl (meth)acrylate, cetyleicosyl (meth)acrylate, stearyleicosyl (meth)acrylate, docosyl (meth)acrylate and/or eicosyltetratriacontyl (meth)acrylate. 2-decyl-tetradecyl, 2-decyloctadecyl, 2-dodecyl-1-hexadecyl, 1,2-octy-1-dodecyl, 1,2-tetradecyl-octadecyl and 2-hexadecyl-eicosyl methacrylates.

Additionally, it is preferred that the segment B comprises repeating units obtainable by polymerization of at least a first compound of Formula (II) and a second compound of Formula (II). Preferably, the first and the second compounds of Formula (II) are both methacrylic acid esters.

The first compound represented by Formula (II) is typically a methacrylic ester of an alcohol having 2 to 5 carbon atoms. Preferably, the substituent $R^3$ of the first compound represented by Formula (II) is selected from the group consisting of ethyl, propyl, isopropyl, n-butyl, sec-butyl, tert-butyl and n-pentyl. Examples of the first compound represented by Formula (II) include linear and branched (meth)acrylates which derive from saturated alcohols, such as ethyl (meth)acrylate, n-propyl (meth)acrylate, isopropyl (meth)acrylate, n-butyl (meth)acrylate, and tert-butyl (meth) acrylate. In a particularly preferred embodiment, the first compound represented by Formula (II) is n-butyl methacrylate.

The performance of the graft copolymer of the present invention at low temperatures is particularly advantageous when the first compound of Formula (II) is present in an amount of from 0% by weight to 90% by weight, preferably from 20% by weight to 85% by weight, more preferably from 30% by weight to 80% by weight and particularly preferably from 40% by weight to 70% by weight, based on the weight of the segment B. Additionally, to ensure a good solubility of the graft copolymer in a base oil, it is advantageous that the content of the first compound of Formula (II) is not higher than 90% by weight, preferably not higher than 80% by weight, more preferably not higher than 70% by weight, particularly preferably not higher than 50% by weight, based on the weight of the segment B.

The second compound represented by Formula (II), if present, is usually a methacrylic ester of an alcohol having 6 to 15 carbon atoms, preferably 12 to 15 carbon atoms. The substituent $R^3$ of the second compound of Formula (II) may be selected from n-hexyl, n-heptyl, cyclohexyl, methylhexyl, n-octyl, n-nonyl, n-decyl, n-undecyl, n-dodecyl, n-tridecyl, n-tetradecyl and n-pentadecyl. Examples of the second compound represented by Formula (II) include linear and branched (meth)acrylates which derive from saturated alcohols, such as pentyl (meth)acrylate, hexyl (meth)acrylate, 2-ethylhexyl (meth)acrylate, heptyl (meth)acrylate, 2-tert-butylheptyl (meth)acrylate, octyl (meth)acrylate, 3-isopropylheptyl (meth)acrylate, nonyl (meth)acrylate, decyl (meth)acrylate and undecyl (meth)acrylate; and cycloalkyl (meth)acrylates such as cyclopentyl (meth)acrylate, cyclohexyl (meth)acrylate, 3-vinylcyclohexyl (meth)acrylate and bornyl (meth)acrylate. In a particularly preferred embodiment, the second compound represented by Formula (II) is n-dodecyl methacrylate (lauryl methacrylate). Technically available alcohols are usually mixtures of C12 and C14 or C12, C14 and C16 or C12, C13, C14 and C15 alcohols which are then used for the preparation of the corresponding methacrylates. The alcohols can be linear or branched depending on the source. Thus, two or more different repeating units falling under the definition of the second compound represented by Formula (II) may be present in the segment B. For instance, the segment B may comprise a combination of n-dodecyl methacrylate, n-tridecyl methacrylate, n-tetradecyl methacrylate and n-pentadecyl methacrylate as repeating units.

In order to achieve an optimal oil solubility of the graft copolymer, the content of the second compound of Formula (II) in the segment B is typically adjusted to from 10% by weight to 100% by weight, more preferred from 15% by weight to 95% by weight, even more preferred from 20% by weight to 90% by weight, yet even more preferred from 40% by weight to 80% by weight, based on the weight of the segment B.

In one preferred embodiment, the segment B comprises butyl methacrylate as a first compound of Formula (II) and lauryl methacrylate as the second compound of Formula (II). For instance, the entire segment B may substantially consist of a combination of butyl methacrylate with lauryl methacrylate. In this embodiment, the molar ratio butyl methacrylate:lauryl methacrylate is typically from 1:10 to 5:1, more preferred from 1:6 to 3:1, yet even more preferred from 1:4 to 3:2, and particularly preferred from 1:2 to 2:1.

In addition to the first compound of Formula (II) and the second compound of Formula (II), the segment B may further comprise a third compound of Formula (II). In these embodiments, the third compound represented by Formula (II) may be a methacrylic acid ester of an alcohol having 16 to 20, preferably 16 to 18 carbon atoms. The substituent $R^3$ of the third compound of Formula (II) may be selected from n-hexadecyl, n-heptadecyl, n-octadecyl, n-nonadecyl and n-eicosanyl. In a particularly preferred embodiment, the third compound of Formula (II) is n-octadecyl methacrylate. Again, the segment B may comprise two or more different repeating units falling under the definition of the third compound of Formula (II). For instance, the segment B may comprise a combination of repeating units derived from stearyl methacrylate, n-nonadecyl methacrylate and n-eicosanyl methacrylate. Examples of monomers of the third compound of Formula (II) include linear and branched (meth)acrylates which derive from saturated alcohols, such as hexadecyl (meth)acrylate, 2-methylhexadecyl (meth)acrylate, 2-methylpentadecyl (meth)acrylate, 2-ethyltetradecyl (meth)acrylate, 2-propyltridecyl (meth)acrylate, 2-butyldodecyl (meth)acrylate, 2-methylhexadecyl (meth)acrylate, 2-pentyldodecyl (meth)acrylate, 2-hexyldecyl (meth)acrylate, 2-hexylundecyl (meth)acrylate, n-heptadecyl (meth)acrylate, 5-isopropylheptadecyl (meth)acrylate, 5-ethyloctadecyl (meth)acrylate, octadecyl (meth)acrylate, nonadecyl (meth)acrylate, eicosyl (meth)acrylate; cycloalkyl (meth) acrylate, such as 2,4,5 tri-tert-butyl-3 vinylcyclohexyl (meth)acrylate, 2,3,4,5-tetra-tert-butylcyclohexyl (meth) acrylate.

The content of the third compound of Formula (II), if present in the segment B, is typically from 0% by weight to 30% by weight, preferably from 5% by weight to 25% by weight, even more preferably from 10% by weight to 20% by weight, based on the weight of the segment B.

As will be readily appreciated by a skilled person, alkyl (meth)acrylates of long-chain alcohols, especially the second compound of Formula (II) and the third compound of Formula (II), can be obtained, for example, by reacting (meth)acrylates and/or the corresponding acids with long-chain fatty alcohols, generally forming a mixture of esters, for example (meth)acrylates with various long-chain alcohol substituents. These fatty alcohols include Oxo Alcohol® 7911, Oxo Alcohol® 7900, Oxo Alcohol® 1100; Alfol® 610, Alfol® 810, Lial® 125, Safol®23, Isofol®12, Isofol®16, Isofol®18, Isofol®18, Isofol® 20, Isofol® 24, Isofol® 28, Isofol® 32, Lial® 167 and Nafol® products (Sasol); OxocoC13 (Kyowa), Linevol® 79, Linevol® 911 and, Neodol® 25E (Shell); Dehydad®, Hydrenol® and Lorol® products (Cognis); Exxal® 10, Exxal® 13, (Exxon Chemicals); Kalcol® 2465 (Kao Chemicals), Mascol24 (Musimas), Ecorol 24 (Ecogreen). The commercially available long-chain alcohol are commonly mixtures of alcohols having different number of carbon atoms. Accordingly, if the third compound of Formula (II) is present in the graft copolymers of the present invention, typically two or more different repeating units falling under the definition of the third compound represented by Formula (II) are present in the segment B.

The molar ratio of the first compound of Formula (II) to the second compound of Formula (II) and, if present, to the third compound of Formula (II) is not particularly limited, as long as the graft copolymer of the present invention has an adequate oil solubility. It is, however, preferred that the molar ratio of the first compound represented by Formula (II) to the second compound represented by Formula (II) is in the range from 1:6 to 3:1, more preferably from 1:4 to 3:2, even more preferably from 1:2 to 2:1. As will be readily appreciated by skilled person, the exact composition of the segment B and, in particular, the molar ratio of the first compound represented by Formula (II) to the second compound represented by Formula (II) may be adjusted by choosing an appropriate molar ratio of the corresponding monomers before the ATRP polymerization step is carried out. In the resulting copolymer the molar ratio of the first compound of Formula (II) to the second compound of Formula (II) may be readily determined by a common analytical technique such as $^1$H-NMR. For this purpose, the $^1$H-NMR spectra can be recorded on an instrument such as Bruker AV500 in deuterated chloroform ($CDCl_3$) as a solvent. The solvent peak at 7.26 ppm can be used as an internal standard.

Although the segment B largely consists of optionally substituted alkyl (meth)acrylates represented by Formula (II) it may further comprise repeating units derived from one or more dispersing monomers. The term "dispersing monomer" as used herein refers to monomers with functional groups, for which it can be assumed that graft copolymers of the present invention with these functional groups can keep particles, especially soot particles, in solution (cf. R. M. Mortier, S. T. Orszulik (eds.): "Chemistry and Technology of Lubricants", Blackie Academic & Professional, London, 2$^{nd}$ ed. 1997). These include especially monomers which have boron-, phosphorus-, silicon-, sulfur-, oxygen- and nitrogen-containing groups, preference being given to oxygen- and nitrogen-functionalized monomers.

In one embodiment, the dispersing monomer may be a vinyl aromatic monomer such as styrene and substituted styrenes although other vinyl monomers can also be used. The substituted styrenes include styrenes that have halo-, amino-, alkoxy-, carboxy-, hydroxy-, sulfonyl- or hydrocarbyl-substituents, wherein the hydrocarbyl group has from 1 to 12 carbon atoms and other substituents. Exemplary of the hydrocarbyl-substituted styrenes are α-methylstyrene, para-tert-butylstyrene, α-ethylstyrene, and para-lower alkoxy styrene. Although mixtures of two or more vinyl monomers can be used, use styrene as a sole dispersing monomer is preferred. If a vinyl aromatic monomer is used as a dispersing monomer, its content in the segment B is typically 0 to 30% by weight, more preferred 1 to 20% by weight, even more preferred 2 to 15% by weight and particularly preferred 3 to 10% by weight, based on the weight of the segment B.

In a further embodiment of the present invention, the dispersing monomer may be a monomer selected from the group consisting of N-vinylic monomers, (meth)acrylic esters, (meth)acrylic amides, (meth)acrylic imides each with dispersing moieties in the side chain and may be an N-dispersant monomer of the Formula (V)

wherein $R^{10}$, $R^{11}$ and $R^{12}$ independently are a hydrogen atom or a linear or branched alkyl group with 1 to 5 carbon atoms and $R^{13}$ is either a group $C(Y)X$—$R^{14}$ with X=O or X=NH and Y is (=O) or (=NR$^{15}$), where $R^{15}$ is an alkyl group with 1 to 8 carbon atoms or an aryl group, and $R^{14}$ represents a linear or branched alkyl group with 1 to 20 carbon atoms which is substituted by a group —NR$^{16}$R$^{17}$ wherein $R^{16}$ and $R^{17}$ independently represent a hydrogen atom or a linear or branched alkyl group with 1 to 8 carbon atoms, or wherein $R^{16}$ and $R^{17}$ together with the nitrogen to which they are bound form a 4- to 8-membered saturated or unsaturated ring containing optionally one or more hetero atoms chosen from the group consisting of nitrogen, oxygen or sulfur, wherein said ring may be further substituted with alkyl or aryl groups, or $R^{13}$ is a group NR$^{18}$R$^{19}$, wherein $R^{18}$ and $R^{19}$ together with the nitrogen to which they are bound form a 4- to 8-membered saturated or unsaturated ring, containing at least one carbon atom as part of the ring which forms a double bond to a hetero atom chosen from the group consisting of nitrogen, oxygen or sulfur, wherein said ring may be further substituted with alkyl or aryl groups.

In one embodiment, $R^{14}$ represents a hydrogen atom or a linear or branched alkyl group with 2 to 6 carbon atoms.

Non-limiting examples of dispersing monomers include those selected from the group consisting of vinyl substituted nitrogen heterocyclic monomers, for example vinyl pyridine, and N-vinyl-substituted nitrogen heterocyclic monomers, for example, N-vinyl imidazole, N-vinyl pyrrolidinone (NVP), morpholinoethyl methacrylate and N-vinyl caprolactam; dialkylaminoalkyl acrylate and methacrylate monomers, for example N,N-dialkylaminoalkyl acrylates, for example N,N-dimethylaminoethyl methacrylate (DMAEMA), tert-butyl aminoethyl methacrylate, dialkylaminoalkyl acrylamide and methacrylamide monomers, for example di-lower alkylaminoalkylacrylamide, especially where each alkyl or aminoalkyl group contains from 1 to about 8 carbon atoms, especially from 1 to 3 carbon atoms, for example N,N-dialkyl, especially, N,N-dimethylaminopropylmethacrylamide (DMAPMAM), dimethylaminopropylacrylamide, dimethylaminoethylacrylamide, N-tertiary alkyl acrylamides and corresponding methacrylamides, for example tertiary butyl acrylamide, vinyl substituted amines, and N-vinyl lactam such as N-vinyl pyrrolidinone. The dispersing monomer may specifically be at least one monomer selected from the group consisting of N-vinyl pyrrolidinone, N,N-dimethylaminoethyl methacrylate, and N,N-dimethylaminopropyl methacrylamide.

In yet a further embodiment, the dispersing monomers include hydroxyalkyl (meth)acrylates such as 3-hydroxypropyl methacrylate, 3,4-dihydroxybutyl methacrylate, 2-hydroxyethyl methacrylate, 2-hydroxypropyl methacrylate, 2,5-dimethyl-1,6-hexanediol (meth)acrylate, 1,10-decanediol (meth)acrylate, carbonyl-containing methacrylates such as 2-carboxyethyl methacrylate, carboxymethyl methacrylate, oxazolidinylethyl methacrylate, N-(methacryloyloxy)formamide, acetonyl methacrylate, N-methacryloylmorpholine, N-methacryloyl-2-pyrrolidinone, N-(2-methacryloyloxyethyl)-2-pyrrolidinone, N-(3-methacryloyloxypropyl)-2-pyrrolidinone, N-(2-methacryloyloxypentadecyl)-2-pyrrolidinone, N-(3-methacryloyloxyheptadecyl)-2-pyrrolidinone; glycol dimethacrylates such as 1,4-butanediol methacrylate, 2-butoxyethyl methacrylate, 2-ethoxyethoxymethyl methacrylate, 2-ethoxyethyl methacrylate; methacrylates of ether alcohols, such as tetrahydrofurfuryl methacrylate, vinyloxyethoxyethyl methacrylate, methoxyethoxyethyl methacrylate, 1-butoxypropyl methacrylate, 1-methyl-(2-vinyloxy)ethyl methacrylate, cyclohexyloxymethyl methacrylate, methoxymethoxyethyl methacrylate, benzyloxymethyl methacrylate, furfuryl methacrylate, 2-butoxyethyl methacrylate, 2-ethoxyethoxymethyl methacrylate, 2-ethoxyethyl methacrylate, allyloxymethyl methacrylate, 1-ethoxybutyl methacrylate, methoxymethyl methacrylate, 1-ethoxyethyl methacrylate, ethoxymethyl methacrylate and ethoxylated (meth)acrylates which have preferably from 1 to 20, in particular from 2 to 8, ethoxy groups; aminoalkyl (meth)acrylates and aminoalkyl (meth)acrylatamides, such as N-(3-dimethylaminopropyl)methacrylamide, dimethylaminopropyl methacrylate, 2-dimethylaminoethyl methacrylate, 3-diethylaminopentyl methacrylate, 3-dibutylaminohexadecyl (meth)acrylate; nitriles of (meth)acrylic acid and other nitrogen-containing methacrylates, such as N-(methacryloyl-oxyethyl)diisobutyl ketimine, N-(methacryloyloxyethyl)dihexadecyl ketimine, methacryloylamido-acetonitrile, 2-methacryloyloxyethylmethylcyanamide, cyanomethyl methacrylate; heterocyclic (meth)acrylates such as 2-(1-imidazolyl)-ethyl (meth)acrylate, 2-(4-morpholinyl)ethyl (meth)acrylate and 1-(2-methacryloyloxyethyl)-2-pyrrolidone; oxiranyl methacrylates such as 2,3-epoxybutyl methacrylate, 3,4-epoxybutyl methacrylate, 10,11-epoxyundecyl methacrylate, 2,3-epoxycyclohexyl methacrylate, 10,11-epoxyhexadecyl methacrylate; glycidyl methacrylate; sulfur-containing methacrylates such as ethylsulfinylethyl methacrylate, 4-thiocyanatobutyl methacrylate, ethylsulfonylethyl methacrylate, thiocyanatomethyl methacrylate, methylsulfinylmethyl methacrylate, bis(methacryloyloxyethyl)sulfide; phosphorus-, boron- and/or silicon-containing methacrylates such as 2-(dimethylphosphato)propyl methacrylate, 2-(ethylenephosphito)propyl methacrylate, dimethylphosphinomethyl methacrylate, dimethylphosphonoethyl methacrylate, diethylmethacryloyl phosphonate, dipropylmethacryloyl phosphate, 2-(dibutylphosphono)-ethyl methacrylate, 2,3-butylenemethacryloylethyl borate, methyldiethoxymethacryloylethoxysilane, diethylphosphatoethyl methacrylate.

The ethoxylated (meth)acrylates which can be used as dispersing monomers can be obtained, for example, by transesterification of alkyl (meth)acrylates with ethoxylated alcohols which more preferably have from 1 to 20, in particular from 2 to 8, ethoxy groups. The hydrophobic substituent of the ethoxylated alcohols may preferably comprise from 1 to 40, in particular from 4 to 22, carbon atoms, and either linear or branched alcohol substituents may be used. In a further preferred embodiment, the ethoxylated (meth)acrylates have an OH end group.

Examples of commercially available ethoxylates which can be employed for the preparation of ethoxylated (meth)acrylates are ethers of the Lutensol® A brands, in particular Lutensol® A 3 N, Lutensol® A 4 N, Lutensol® A 7 N and Lutensol® A 8 N, ethers of the Lutensol® TO brands, in particular Lutensol® TO 2, Lutensol® TO 3, Lutensol® TO 5, Lutensol® TO 6, Lutensol® TO 65, Lutensol® TO 69, Lutensol® TO 7, Lutensol® TO 79, Lutensol® 8 and Lutensol® 89, ethers of the Lutensol® AO brands, in particular Lutensol® AO 3, Lutensol® AO 4, Lutensol® AO 5, Lutensol® AO 6, Lutensol® AO 7, Lutensol® AO 79, Lutensol® AO 8 and Lutensol® AO 89, ethers of the Lutensol® ON brands, in particular Lutensol® ON 30, Lutensol® ON 50, Lutensol® ON 60, Lutensol® ON 65, Lutensol® ON 66, Lutensol® ON 70, Lutensol® ON 79 and Lutensol® ON 80, ethers of the Lutensol® XL brands, in particular Lutensol® XL 300, Lutensol® XL 400, Lutensol® XL 500, Lutensol® XL 600, Lutensol® XL 700, Lutensol® XL 800, Lutensol® XL 900 and Lutensol® XL 1000, ethers of the Lutensol® AP brands, in particular Lutensol® AP 6, Lutensol® AP 7, Lutensol® AP 8, Lutensol® AP 9, Lutensol® AP 10, Lutensol® AP 14 and Lutensol® AP 20, ethers of the IMBENTIN® O brands, in particular of the IMBENTIN® AG brands, of the IMBENTIN® U brands, of the IMBENTIN® C brands, of the IMBENTIN® T brands, of the IMBENTIN® OA brands, of the IMBENTIN® POA brands, of the IMBENTIN® N brands and of the IMBENTIN® O brands and ethers of the Marlipal® brands, in particular Marlipal® 1/7, Marlipal® 1012/6, Marlipal® 1618/1, Marlipal® 24/20, Marlipal® 24/30, Marlipal® 24/40, Marlipal® 013/20, Marlipal® 013/30, Marlipal® 013/40, Marlipal® 025/30, Marlipal® 025/70, Marlipal® 045/30, Marlipal® 045/40, Marlipal® 045/50, Marlipal® 045/70 and Marlipal® 045/80.

Among the dispersing monomers for use in the graft copolymer of the present invention, particular preference is given to aminoalkyl (meth)acrylates and aminoalkyl (meth)acrylamides, for example N-(3-dimethylaminopropyl)methacrylamide (DMAPMAM), and hydroxyalkyl (meth)acrylates, for example 2-hydroxyethyl methacrylate (HEMA).

The segment A in the graft copolymer of the present invention comprises repeating units obtainable by ROMP of at least one compound represented by Formula (I) and at least one ATRP initiator. The precise position of the substituent $R^1$ on the cyclooctene moiety is not particularly limited. Thus, the compound represented by Formula (I) may have one of the following structures (Ia) to (Ic):

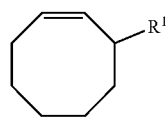
(Ia)

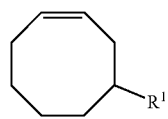
(Ib)

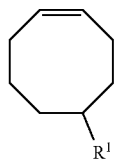
(Ic)

Typically, the segment A comprises at least one repeating unit derived from a compound represented by Formula (Ia). Nevertheless, the segment A may comprise one or several compounds represented by Formula (Ia), Formula (Ib) and/or Formula (Ic).

Depending on the desired properties of the graft copolymer of the present invention, the substituent $R^1$ may be a hydrogen atom or an alkyl group having 1 to 40 carbon atoms, more preferably 1 to 20 carbon atoms, even more preferably 1 to 15 carbon atoms, particularly preferably 1 to 10 carbon atoms. Thus, for instance, the segment A may comprise a single compound of Formula (I) in which the substituent $R^1$ is a hydrogen atom, i.e. repeating units derived from cyclooctene.

In yet an alternative embodiment, the segment A may comprise a combination of two or more compounds of Formula (I), preferably of Formula (Ia). For instance, the segment A may comprise a first compound represented by Formula (I), in which $R^1$ is a hydrogen atom and a second compound represented by Formula (I), where $R^1$ is an alkyl group, preferably an alkyl group having 1 to 40 carbon atoms, more preferably 1 to 20 carbon atoms, yet even more preferably 1 to 10 carbon atoms, particularly preferably 1 to 5 carbon atoms. In one preferred embodiment, $R^1$ is an ethyl group. Generally, the low-temperature properties of the graft copolymer of the present invention are particularly advantageous if $R^1$ is an alkyl group having 1 to 5 carbon atoms.

If the segment A comprises a first compound of Formula (I) and a second compound of Formula (I), it is advantageous that the molar ratio of the first compound of Formula (I) to the second compound of Formula (I) is in the range from 1:10 to 2:1, more preferably from 1:7 to 1:1, even more preferably from 1:4 to 1:1. For instance, the segment A may comprise repeating units derived from cyclooctene and repeating units derived from 3-ethylcyclooctene in a molar ratio from 1:10 to 2:1, more preferably, from 1:7 to 1:1 and particularly preferred from 1:4 to 1:1. The desired composition of the segment A may be adjusted by selecting an appropriate molar ratio of the starting materials before the ROMP step. Subsequently, the composition of the segment A may be verified by a common technique such as $^1$H-NMR.

In a preferred embodiment of the present invention, the segment A has a number average molecular weight Mn of from 10 000 g/mol to 500 000 g/mol, more preferred from 50 000 g/mol to 300 000 g/mol, yet even more preferred from 100 000 g/mol to 200 000 g/mol, as measured by size exclusion chromatography (SEC), calibrated versus a polystyrene standard. Typically, the dispersity Ð of the segment A is from 1 to 5, more preferably from 1.2 to 3, even more preferably from 1.5 to 2.

Molar masses Mn and Mw and dispersity (Ð) of all polymers specified in the present application are preferably measured by SEC on an instrument Agilent 1100 series equipped with three PLgel 5 µm Mixed-C columns and a refractive index detector (HewlettPackard 1047A) at 35° C. Chloroform (CHCl$_3$) is employed as the mobile phase at a flow rate of 1 mL/min, and the samples are prepared at the concentration of 1 mg/mL in CHCl$_3$. The system is calibrated by polystyrene standards.

Typically, the molecular weight of the segment A is higher than the molecular weight of the segment B. The number average molecular weight Mn of the entire graft copolymer of the present invention is preferably from 100 000 g/mol to 1 000 000 g/mol, more preferably from 300 000 g/mol to 850 000 g/mol, even more preferably from 400 000 g/mol to 700 000 g/mol. In a preferred embodiment, the dispersity of the entire graft copolymer of the present invention is from 1 to 7, more preferably, from 1.5 to 5, even more preferably from 2 to 3.

As already mentioned above, the ATRP initiator may be an ester of α-bromo-isobutyric acid with an alcohol comprising an unsaturated alicyclic moiety. For instance, the ATRP initiator bearing an optionally substituted cycloalkenyl substituent may be a compound represented by Formula (III):

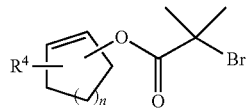
(III)

In a particularly preferred embodiment, $R^4$ is a hydrogen atom. Alternatively, however, $R^4$ may be represented by an optionally substituted hydrocarbon group having from 1 to 40 carbon atoms, for instance, by an alkyl group having from 1 to 20 carbon atoms, e.g. from 1 to 10 carbon atoms.

The ring size of the optionally substituted cycloalkenyl substituent in the Formula (III) is not particularly limited, as long as the cycloalkenyl substituent has a sufficient reactivity to undergo ROMP so that the repeating unit corresponding to the ATRP initiator is incorporated into the segment A during the ROMP step. Typically, n in the Formula a(III) is from 1 to 8, preferably, from 2 to 7, particularly preferably 4.

Thus, the ATRP initiator may be represented by the following Formula (IIIa):

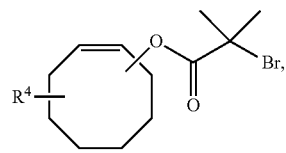
(IIIa)

wherein the structures of Formulae (IIIb)-(IIId) shown below are even more preferred:

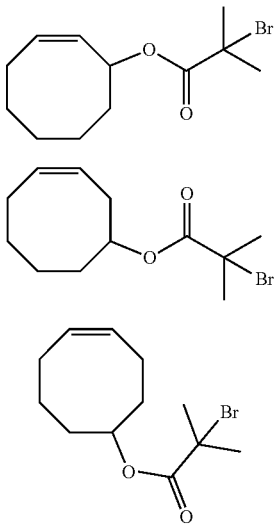

According to the present invention, use of the ATRP initiator having the Formula (IIIb) is particularly preferred.

In a particularly preferred embodiment, the graft copolymer of the present invention is represented by Formula (IV) below:

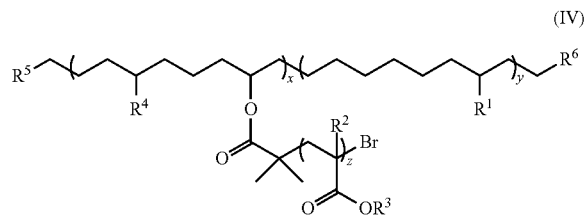

wherein $R^1$, $R^2$, $R^3$ and $R^4$ are as defined above and $R^5$ and $R^6$ are independently from each other hydrogen atoms or alkyl groups having 1 to 19 carbon atoms.

As already explained above, the side chain of the graft copolymer represented by Formula (IV) may comprise two or more different (meth)acrylate repeating units.

The parameter x in the Formula (IV) represents the number of side chains comprising the segments B in the entire graft copolymer. The inventors found that the viscosity index of the graft copolymer is particularly high when x is at least 5, more preferably, at least 10, even more preferably, at least 20. Furthermore, from the viewpoint of optimal thickening efficiency, VI and HTHS of the graft copolymer, x is preferably kept from 5 to 200, more preferably from 10 to 150, yet even more preferably from 20 to 100.

The parameter y reflects the number of repeating unit derived from the compound represented by Formula (I) in the segment A. The corresponding repeating units are typically relatively nonpolar and therefore the polarity of the graft copolymer decreases with the increasing y. For achieving an optimal viscosity index of the graft copolymer, it is desired that y is at least 100, more preferably at least 200, yet even more preferably at least 300. Ideally, the parameter y is chosen in the range from 100 to 1 500, even more preferably, from 200 to 1 200, yet even more preferably from 300 to 1 000. Without wishing to be bound by a theory, applicants believe that for the sake of achieving an optimal thickening efficiency, the molecular weight of the backbone is preferably chosen to be from 50 000 g/mol to 300 000 g/mol. The above limit is set by the permanent shear stability which generally tends to decrease with increasing molecular weight.

The parameter z corresponds to the number of repeating units derived from the compound represented by Formula (II) within a single side chain. In other words, the parameter z reflects the length of side chains. Depending on the nature of the substituent $R^3$, the side chains of the graft copolymer are relatively polar, i.e. are more polar than the backbone. Therefore, the polarity of the entire graft copolymer increases with the increasing parameter z. Generally, the viscosity index of the graft copolymer as well as its thickening efficiency increases with the increasing parameter z. Therefore, z is typically at least 100, preferably at least 500, even more preferably at least 700. To achieve an optimal overall balance between thickening efficiency, solubility and shear stability of the graft copolymer, z is selected to be from 100 to 1 500, preferably from 500 to 1 200, yet even more preferably from 700 to 1 000.

Accordingly, the average molecular weight of individual side chains of the graft copolymer is usually below 1 000 000 g/mol, preferably below 700 000 g/mol, particularly preferably below 450 000 g/mol and even more preferably below 350 000 g/mol. The average molecular weight Mn of individual side chains of the graft copolymer is usually higher than 20 000 g/mol, preferably above 50 000 g/mol. To achieve an optimal overall performance of the graft copolymer, the average molecular weight Mn of each single side chain of the graft copolymer is in the range of 20 000 g/mol to 1 000 000 g/mol, preferably 50 000 g/mol to 700 000 g/mol, more preferably in the range of 50 000 g/mol to 350 000 g/mol.

Nevertheless, graft copolymer having molecular weight Mn of individual side chains above 50 000 g/mol are suitable for use as a viscosity index improvers. These values correspond to the parameter z of not higher than 500, preferably not higher than 200, particularly preferably not higher than 100.

Additionally, the inventors surprisingly found that the thickening efficiency and HTHS of the graft copolymer of the present invention, when used as an engine oil additive, are particularly high if the ratio x:y is chosen in the range from 1:5 to 1:20, preferably from 1:8 to 1:15, even more preferably from 1:10 to 1:14.

In one preferred embodiment of the present invention, the segment B of the graft copolymer has a total number average molecular weight Mn of from 20 000 g/mol to 1 000 000 g/mol, more preferably from 50 000 g/mol to 700 000 g/mol, even more preferably from 50 000 g/mol to 200 000 g/mol, and comprise repeating units derived from butylmethacrylate as a first compound represented by Formula (II) and laurylmethacrylate as a second compound represented by Formula (II), the molar ratio of the repeating units derived from butylmethacrylate to the molar ratio of the repeating units derived from laurylmethacrylate being in the range from 1:2 to 2:1; and the at least the segment A comprises repeating units obtainable by ring-opening metathesis polymerization of cyclooctene being the first compound represented by Formula (I) and 3-ethylcyclooctene being the second compound represented by Formula (I), the molar ratio of the repeating units derived from cyclooctene to the molar ratio of the repeating units derived from 3-ethylcyclooctene being in the range from 1:4 to 1:1.

In yet a further preferred embodiment, the segment B of the graft copolymer has a total number average molecular weight Mn of from 20 000 g/mol to 1 000 000 g/mol, more preferably from 50 000 g/mol to 700 000 g/mol, even more preferably from 50 000 g/mol to 200 000 g/mol, and comprise repeating units derived from butylmethacrylate as a first compound represented by Formula (II) and laurylmethacrylate as a second compound represented by Formula (II), the molar ratio of the repeating units derived from butylmethacrylate to the molar ratio of the repeating units derived from laurylmethacrylate being in the range from 1:2 to 2:1; and the at least segment A comprises repeating units obtainable by ring-opening metathesis polymerization of cyclooctene being the only compound represented by Formula (I).

The residues $R^5$ and $R^6$ in the Formula (IV) may be independently from each other hydrogen atoms or alkyl groups having 1 to 19 carbon atoms, preferably from 1 to 9 carbon atoms, for example 2 to 5 carbon atoms. Preferably, the residues $R^5$ and $R^6$ are identical. As will be readily appreciated by a skilled person, the residues $R^5$ and $R^6$ are derived from an olefin which is employed as a chain transfer agent during the ROMP step. Preferably, the chain transfer agent is a cis-olefin, more preferably a C2-symmetrical cis-olefin. For instance, when the ROMP step is carried out in the presence of cis-octene, $R^5$ and $R^6$ are n-propyl.

Generally speaking, the graft copolymers of the present invention have a better thickening efficiency (TE) than polyalkyl methacrylates (PAMAs) due to the presence of repeating units derived from the compound of Formula (I). Additionally, the graft copolymers also show a better low temperature behavior than olefin copolymers (OCPs) due to the presence of side chains comprising alkyl (meth)acrylate repeating units.

Process for the Manufacturing of the Graft Copolymer

A further aspect of the present invention relates to a process for the manufacturing of the graft copolymer as described above. The process comprises the following steps:

(a) ROMP of a mixture comprising at least one compound of Formula (I) and an ATRP initiator bearing an optionally substituted cycloalkenyl substituent, wherein polymer A is obtained;

(b) ATRP of the compound of Formula (II) in the presence of the polymer A obtained in the step (a) wherein polymer B is obtained;

(c) hydrogenation of the polymer B obtained in the step (b) wherein the graft copolymer of the present invention is obtained.

Thus, a preferred embodiment of the preparation process of the present invention can be schematically represented by the following Scheme 1:

Scheme 1: Example of preparation of the graft copolymer of the present invention

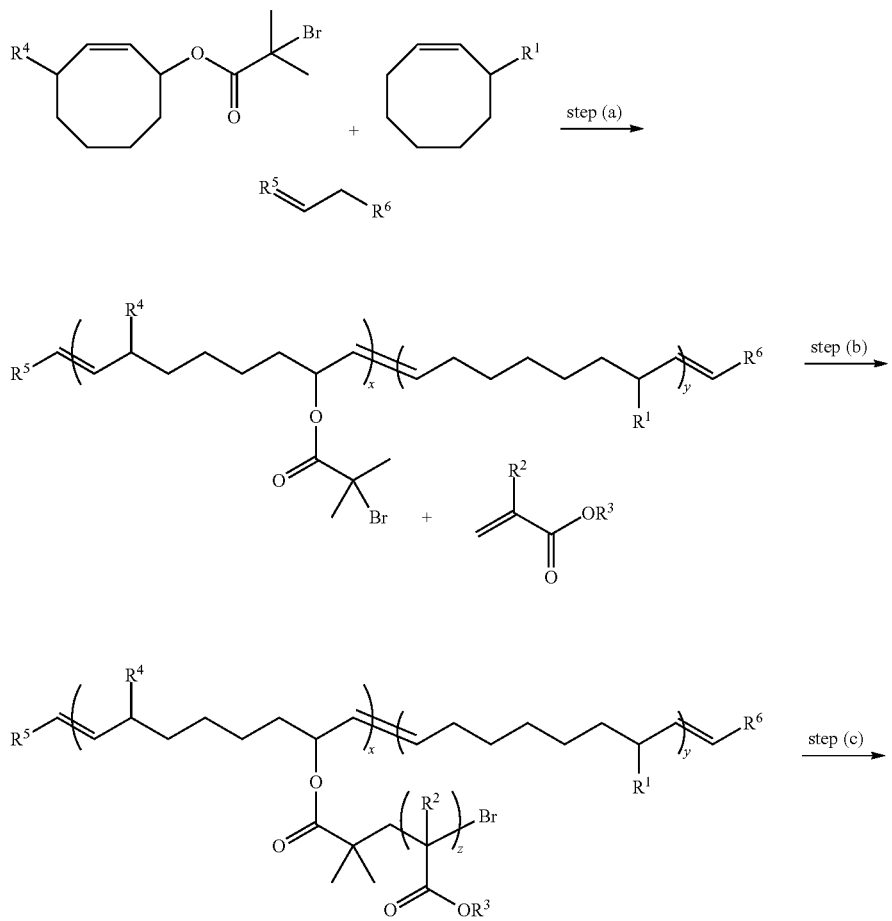

-continued

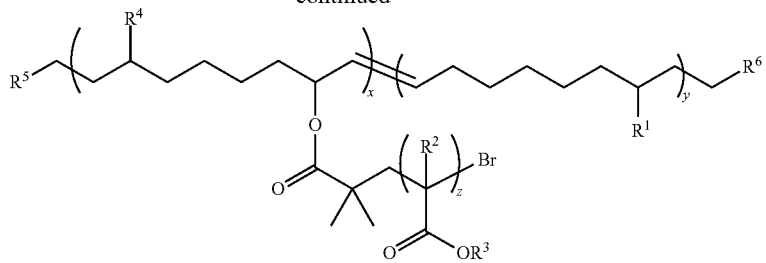

The process of the present invention may be carried out similarly to the procedure described by Y. Xu et al. (Macromolecules, 2012, 45, 9604-9610) the entire disclosure of which is incorporated herein by reference. However, in contrast to the procedure by Y. Xu et al. the method of the present invention employs the ATRP step (b) directly after the ROMP step (a) and the hydrogenation is carried out in the last step (c).

This order of process steps (a)-(c) offers a significant advantage over the procedure of Y. Xu et al. In the method of Y. Xu et al. a significant degradation of the product of ROMP and, in particular, an undesired reduction of ATRP initiating sites takes place. The inventors found that the polymer A obtainable in the step (a) can be used as a substrate for an ATRP (i.e. in the present step (b)). In the subsequent step, the resulting polymer B can be hydrogenated to deliver the graft copolymer of the present invention in an excellent yield. Thus, the process of the present invention successfully overcomes the problem of undesired degradation of ATRP initiating sites during hydrogenation.

In the step (a), the ROMP is carried out in the presence of at least one compound of Formula (I) and an an ATRP initiator bearing an optionally substituted cycloalkenyl substituent. Depending on the reaction conditions, the repeating units derived from the compound of Formula (I) and the ATRP initiator bearing an optionally substituted cycloalkenyl substituent may be arranged randomly or as block-comonomers. This step is carried out in the presence of a chain transfer agent which is preferably acyclic olefin, more preferably of a symmetric acyclic olefin, e.g. cis-oct-4-ene. As a catalyst in step (a) any known carbene-type metathesis catalyst, preferably a ruthenium catalyst, can be employed. The corresponding catalysts are well-known to a skilled person and, for example, (1,3-bis(2,4,6-trimethylphenyl)-2-imidazolidinylidene)dichloro(phenylmethylene)(tricyclohexylphosphine) ruthenium (Grubbs catalyst of second generation) can be advantageously used for this step. The step (a) may be carried out in the presence of a solvent generally known to be suitable for metathesis e.g. dichloromethane or chloroform.

The step (b) of the process is ATRP of the compound of Formula (II) in the presence of the polymer A obtained in the step (a). This reaction step may be carried out under conditions commonly employed for ATPR and a copper (I) salt such as copper (I) bromide may be used as a catalyst. The authors found that the catalyst can be used in particularly low amounts if the copper (I) salt is generated in situ from a copper (II) salt in the presence of a reducing agent (e.g. Tin(II) 2-ethylhexanoate, $Sn(EH)_2$). Additionally, this allows carrying out the ATRP step without a need to perform deoxygenation and in the presence of some amounts of air.

In the subsequent step (c), the polymer B obtained in the above step (b) is hydrogenated so that the double bonds of the polymer are reduced. Preferably, at least 80% of double bonds of the polymer, more preferably at least 90% of double bonds, yet even more preferably at least 95% of double bonds and, particularly preferably, at least 98% of double bonds of the polymer are reduced in this step.

Preferably, the graft copolymer of the present invention has a hydrogenation level of at least 99%. An alternative measure of the hydrogenation level which can be determined on the graft copolymer of the invention is the iodine number. The iodine number refers to the number of grams of iodine which can be added onto 100 g of graft copolymer. Preferably, the graft copolymer of the invention has an iodine number of not more than 5 g of iodine per 100 g of copolymer. The iodine number is determined by the Wijs method according to DIN 53241-1:1995-05.

The reducing conditions are not particularly limited as long as other functional groups of the polymer B, in particular the ester functionality are not affected. For instance, the step (c) may be carried out in the presence of an acylhydrazine, such as tosylhydrazine. The solvent for the step (c) may be an aromatic solvent having a relatively high boiling point e.g. a xylene such as o-xylene.

Use of Graft Copolymers of the Present Invention

A further aspect of the present invention is directed to a lubricant composition comprising a base oil and at least one copolymer as described above.

The graft copolymer of the present invention preferably has a high oil solubility. The term "oil-soluble" means that a mixture of a base oil and the graft copolymer of the present invention is prepared double without microscopic phase formation, which has at least 0.1% by weight, preferably at least 0.5% by weight, more preferably at least 1% by weight, yet even more preferably at least 4% by weight, yet still even more preferably at least 8% by weight of the graft copolymer, particularly preferably at least 15% by weight of the graft copolymer, based on the weight of the resulting lubricant composition. A solids content of 50% describes the upper limit of the polymer in oil.

A base oil is typically defined as an oil having a boiling point between 260 and 566° C. (500 and 1050 F), consisting of hydrocarbons having 18 to 40 carbon atoms. The base oil for use in accordance with the invention may be a mineral oil, a synthetic oil or a natural oil. It is likewise possible to use mixtures of various base oils. As skilled person is, of course, familiar with these base oils.

Base oils for lubricant oil formulations are divided into groups according to API (American Petroleum Institute). Mineral oils are divided into group I (non-hydrogen-treated) and, depending on the degree of saturation, sulfur content and viscosity index, into groups II and III (both hydrogen-treated). PAOs correspond to group IV. All other base oils are encompassed in group V. Preferred lubricants preferably contain at least one base oil according to group II and/or III, more preferably according to group III, of the classification detailed above.

These base oils may also be used as mixtures and are in many cases commercially available.

Mineral oils are known per se and are commercially available. They are generally obtained from mineral oil or crude oil by distillation and/or refining and optionally further cleaning and finishing processes, the term "mineral oil" especially including the higher-boiling components of crude oil or mineral oil. In general, the boiling point of mineral oil is higher than 200° C., preferably higher than 300° C., at 5 000 Pa. Production by low-temperature carbonization of shale oil, coking of hard coal, distillation of brown coal with exclusion of air, and hydrogenation of hard coal or brown coal is likewise possible. Accordingly, mineral oils, depending on their origin, have different proportions of aromatic, cyclic, branched and linear hydrocarbons.

A reduction in the aromatics content of mineral oils can be achieved by hydrogen treatment of the mineral oils. In this case, aromatic components are reduced in by hydrogenation and naphthenic components are built up.

Synthetic oils include organic esters, for example diesters and polyesters, polyalkylene glycols, polyethers, synthetic hydrocarbons, especially polyolefins, among which polyalphaolefins (PAO) are preferred, silicone oils and perfluoroalkyl ethers. In addition, it is possible to use synthetic base oils originating from gas to liquid (GTL), coal to liquid (CTL) or biomass to liquid (BTL) processes. They are usually somewhat more costly than the mineral oils, but have advantages in terms of their performance.

In general, a distinction is drawn between paraffin-base, naphthenic and aromatic fractions in crude oils or mineral oils, in which the term paraffin-base fraction represents longer-chain or highly branched isoalkanes, and naphthenic fraction represents cycloalkanes. In addition, mineral oils, depending on their origin and finishing, have different fractions of n-alkanes, isoalkanes having a low degree of branching, known as mono-methyl-branched paraffins, and compounds having heteroatoms, in particular O, N and/or S, to which a degree of polar properties are attributed. However, the assignment is difficult, since individual alkane molecules may have both long-chain branched groups and cycloalkane radicals, and aromatic parts. For the purposes of the present invention, the assignment can be effected to DIN 51 378, for example. Polar fractions can also be determined to ASTM D 2007.

The proportion of n-alkanes in preferred mineral oils is less than 3% by weight, the fraction of O, N and/or S containing compounds less than 6% by weight. The fraction of the aromatics and of the mono-methyl-branched paraffins is generally in each case in the range from 0 to 40% by weight. In one interesting embodiment, mineral oil comprises mainly naphthenic and paraffin-base alkanes which have generally more than 13, preferably more than 18 and most preferably more than 20 carbon atoms. The fraction of these compounds is generally above 60% by weight, preferably above 80% by weight, without any intention that this should impose a restriction. A preferred mineral oil contains 0.5 to 30% by weight of aromatic fractions, 15 to 40% by weight of naphthenic fractions, 35 to 80% by weight of paraffin-base fractions, up to 3% by weight of n-alkanes and 0.05 to 5% by weight of polar compounds, based in each case on the total weight of the mineral oil.

An analysis of particularly preferred mineral oils, which can be carried out by means of conventional processes such as urea separation and liquid chromatography on silica gel, shows, for example, the following constituents, the percentages relating to the total weight of the particular mineral oil used:

n-alkanes having about 18 to 31 carbon atoms: 0.7-1.0%,
slightly branched alkanes having 18 to 31 carbon atoms: 1.0-8.0%,
aromatics having 14 to 32 carbon atoms: 0.4-10.7%,
iso and cycloalkanes having 20 to 32 carbon atoms: 60.7-82.4%,
polar compounds: 0.1-0.8%,
loss: 6.9-19.4%.

An improved class of mineral oils (reduced sulfur content, reduced nitrogen content, higher viscosity index, lower pour point) results from hydrogen treatment of the mineral oils (hydroisomerization, hydrocracking, hydrotreatment, hydrofinishing). In the presence of hydrogen, this essentially reduces aromatic components and builds up naphthenic components.

Valuable information with regard to the analysis of mineral oils and a list of mineral oils which have a different composition can be found, for example, in T. Mang, W. Dresel (eds.): "Lubricants and Lubrication", Wiley-VCH, Weinheim 2001; R. M. Mortier, S. T. Orszulik (eds.): "Chemistry and Technology of Lubricants", Blackie Academic & Professional, London, 2nd ed. 1997; or J. Bartz: "Additive für Schmierstoffe", Expert-Verlag, Renningen-Malmsheim 1994.

Synthetic oils include organic esters, for example diesters and polyesters, polyalkylene glycols, polyethers, synthetic hydrocarbons, especially polyolefins, among which preference is given to polyalphaolefins (PAOs), silicone oils and perfluoroalkyl ethers. In addition, it is possible to use synthetic base oils originating from gas to liquid (GTL), coal to liquid (CTL) or biomass to liquid (BTL) processes. They are usually somewhat more expensive than the mineral oils, but have advantages with regard to their performance.

GTL base oil may also be referred to as a Fischer-Tropsch derived base oil. Fischer-Tropsch derived base oils are known in the art. By the term "Fischer-Tropsch derived" is meant that a base oil is, or is derived from, a synthesis product of a Fischer-Tropsch process. A Suitable Fischer-Tropsch derived base oils that may be conveniently used as the base oil in the lubricant composition of the present invention are those as for example disclosed in EP 0 776 959, EP 0 668 342, WO 97/21788, WO 00/15736, WO 00/14188, WO 00/14187, WO 00/14183, WO 00/14179, WO 00/08115, WO 99/41332, EP 1 029 029, WO 01/18156 and WO 01/57166.

Typically, the aromatics content of a Fischer-Tropsch derived base oil, suitably determined by ASTM D 4629, will typically be below 1 wt. %, preferably below 0.5 wt. % and more preferably below 0.1 wt. %. Suitably, the base oil has a total paraffin content of at least 80 wt. %, preferably at least 85 wt. %, more preferably at least 90 wt. %, yet more preferably at least 95 wt. % and most preferably at least 99 wt. %. It suitably has a saturates content (as measured by IP-368) of greater than 98 wt. %.

Preferably the saturates content of the base oil is greater than 99 wt. %, more preferably greater than 99.5 wt. %. It further preferably has a maximum n-paraffin content of 0.5 wt. %. The base oil preferably also has a content of naphthenic compounds of from 0 wt. % to less than 20 wt. %, more preferably of from 0.5 wt. % to 10 wt. %.

Typically, the Fischer-Tropsch derived base oil or base oil blend has a kinematic viscosity at 100° C. (as measured by ASTM D 7042) in the range of from 1 to 30 mm$^2$/s (cSt), preferably from 1 to 25 mm$^2$/s (cSt), and more preferably from 2 to 12 mm$^2$/s (cSt). Preferably, the Fischer-Tropsch derived base oil has a kinematic viscosity at 100° C. (as measured by ASTM D 7042) of at least 2.5 mm$^2$/s, more preferably at least 3.0 mm$^2$/s. In one embodiment of the present invention, the Fischer-Tropsch derived base oil has a kinematic viscosity at 100° C. of at most 5.0 mm$^2$/s, preferably at most 4.5 mm$^2$/s, more preferably at most 4.2 mm$^2$/s (e.g. "GTL 4"). In another embodiment of the present invention, the Fischer-Tropsch derived base oil has a kinematic viscosity at 100° C. of at most 8.5 mm$^2$/s, preferably at most 8 mm$^2$/s (e.g. "GTL 8"). Further, the Fischer-Tropsch derived base oil typically has a kinematic viscosity at 40° C. (as measured by ASTM D 7042) of from 10 to 100 mm$^2$/s (cSt), preferably from 15 to 50 mm$^2$/s.

Also, the Fischer-Tropsch derived base oil preferably has a pour point (as measured according to ASTM D 5950) of below −30° C., more preferably below −40° C., and most preferably below −45° C. The flash point (as measured by ASTM D92) of the Fischer-Tropsch derived base oil is preferably greater than 120° C., more preferably even greater than 140° C. The Fischer-Tropsch derived base oil preferably has a viscosity index (according to ASTM D 2270) in the range of from 100 to 200. Preferably, the Fischer-Tropsch derived base oil has a viscosity index of at least 125, preferably 130. Also it is preferred that the viscosity index is below 180, preferably below 150. In the event the Fischer-Tropsch derived base oil contains a blend of two or more Fischer-Tropsch derived base oils, the above values apply to the blend of the two or more Fischer-Tropsch derived base oils. The lubricating oil composition preferably comprises 80 wt. % or greater of Fischer-Tropsch derived base oil.

Synthetic oils further include hydrocarbon oils such as olefin oligomers (including polyalphaolefin base oils; PAOs), dibasic acid esters, polyol esters, polyalkylene glycols (PAGs), alkyl naphthalenes and dewaxed waxy isomerates. Synthetic hydrocarbon base oils sold by the Shell Group under the designation "Shell XHVI" (trade mark) may be conveniently used.

Poly-alpha olefin base oils (PAOs) and their manufacture are well known in the art. Preferred poly-alpha olefin base oils that may be used in the lubricant composition of the present invention may be derived from linear C2 to C32, preferably C6 to C16, alpha olefins. Particularly preferred feedstocks for said poly-alpha olefins are 1-octene, 1-decene, 1-dodecene and 1-tetradecene. There is a strong preference for using a Fischer-Tropsch derived base oil over a PAO base oil, in view of the high cost of manufacture of the PAOs. Thus, preferably, the base oil contains more than 50 wt. %, preferably more than 60 wt. %, more preferably more than 70 wt. %, even more preferably more than 80 wt. %, most preferably more than 90 wt. % Fischer-Tropsch derived base oil. In an especially preferred embodiment not more than 5 wt. %, preferably not more than 2 wt. %, of the base oil is not a Fischer-Tropsch derived base oil. It is even more preferred that 100 wt. % of the base oil is based on one or more Fischer-Tropsch derived base oils.

Typically the base oil (or base oil blend) as used according to the present invention has a kinematic viscosity at 100° C. (according to ASTM D445) of above 2.5 cSt and below 5.6 cSt. According to a preferred embodiment of the present invention the base oil has a kinematic viscosity at 100° C. (according to ASTM D445) of between 3.5 and 4.5 cSt. In the event the base oil contains a blend of two or more base oils, it is preferred that the blend has a kinematic viscosity at 100° C. of between 3.5 and 4.5 cSt.

The total amount of base oil incorporated in the lubricant composition of the present invention is preferably in the range of from 60 wt. % to 99 wt. %, more preferably in the range of from 65 wt. % to 90 wt. % and most preferably in the range of from 70 wt. % to 85 wt. %, with respect to the total weight of the lubricant composition.

Typically the lubricant compositions of the present invention would be used in, but not necessarily limited to, SAE J300 viscosity grades 0W-20, 0W-30, 0W-40, 5W-20, 5W-30 and 5W-40 as these are the grades which target fuel economy. As new SAE J300 viscosity grades are published, with lower viscosities than the current 0W-20, the present invention would also be very much applicable to these new viscosity lower grades. It is conceivable that the present invention could also be used with higher viscosity grades.

The lubricant composition according to the present invention comprises one or more comb polymers as described above, preferably in a solid polymer amount of from 0.1 wt. % to 10 wt. %, more preferably from 0.25 wt. % to 7 wt. %, and even more preferably from 0.5 wt. % to 4 wt. %, by weight of the total lubricant composition.

The content of the graft copolymer of the present invention in the lubricant composition is preferably in the range of 0.01 wt. % to 40 wt. %, more preferably in the range of 0.5 wt. % to 25 wt. % and most preferably in the range of 1 wt. % to 15 wt. %, based on the total weight of the lubricant composition.

In addition to the graft copolymers of the present invention, the lubricant oil compositions detailed here may also comprise further additives. These additives include VI improvers, pour point improvers and DI additives (dispersants, detergents, defoamers, corrosion inhibitors, antioxidants, antiwear and extreme pressure additives, friction modifiers).

The additionally usable VI improvers include especially poly(alkyl (meth)acrylates) having 1 to 30 carbon atoms in the alcohol group (PAMA; partly N/O-functional with advantageous additional properties as dispersants, antiwear additives and/or friction modifiers), which differ from the graft copolymers of the present invention, and poly(iso)butenes (PIB), fumarate-olefin copolymers, styrene-maleate copolymers, hydrogenated styrene-diene copolymers (HSD) and olefin copolymers (OCP).

The pour point improvers include especially polyalkyl (meth)acrylates (PAMA) having 1 to 30 carbon atoms in the alcohol group.

Compilations of VI improvers and pour point improvers for lubricant oils are also detailed in T. Mang, W. Dresel (eds.): "Lubricants and Lubrication", Wiley-VCH, Weinheim 2001: R. M. Mortier, S. T. Orszulik (eds.): "Chemistry and Technology of Lubricants", Blackie Academic & Professional, London, 2nd ed. 1997; or J. Bartz: "Additive für Schmierstoffe", Expert-Verlag, Renningen-Malmsheim 1994.

Appropriate dispersants include poly(isobutylene) derivatives, e.g. poly(isobutylene)succinimides (PIBSIs); ethylene-propylene oligomers with N/O functionalities.

The preferred detergents include metal-containing compounds, for example phenoxides; salicylates; thiophosphonates, especially thiopyrophosphonates, thiophosphonates and phosphonates; sulfonates and carbonates. As metals, these compounds may comprise especially calcium, magnesium and barium. These compounds may be used preferably in neutral or overbased form.

Of particular interest are additionally defoamers, which are in many cases divided into silicone-containing and silicone-free defoamers. The silicone-containing defoamers include linear poly(dimethylsiloxane) and cyclic poly(dimethylsiloxane). The silicone-free defoamers which may be used are in many cases polyethers, for example poly(ethylene glycol) or tributyl phosphate.

In a particular embodiment, the inventive lubricant oil compositions may comprise corrosion inhibitors. These are in many cases divided into antirust additives and metal passivators/deactivators. The antirust additives used may inter alia be sulfonates, for example petroleumsulfonates or (in many cases overbased) synthetic alkylbenzenesulfonates, e.g. dinonylnaphthenesulfonates; carboxylic acid derivatives, for example lanolin (wool fat), oxidized paraffins, zinc naphthenates, alkylated succinic acids, 4-nonylphenoxy-acetic acid, amides and imides (N-acylsarcosine, imidazoline derivatives); amine-neutralized mono and dialkyl phosphates; morpholine, dicyclohexylamine or diethanolamine. The metal passivators/deactivators include benzotriazole, tolyltriazole, 2-mercaptobenzothiazole, dialkyl-2,5-dimercapto-1,3,4-thiadiazole; N,N'-disalicylideneethylenediamine, N,N'-disalicylidenepropylenediamine; zinc dialkyldithiophosphates and dialkyl dithiocarbamates.

A further preferred group of additives is that of antioxidants. The antioxidants include, for example, phenols, for example 2,6-di-tert-butylphenol (2,6-DTB), butylated hydroxytoluene (BHT), 2,6-di-tert-butyl-4-methylphenol, 4,4'-methylenebis(2,6-di-tert-butylphenol); aromatic amines, especially alkylated diphenylamines, N-phenyl-1-naphthylamine (PNA), polymeric 2,2,4-trimethyldihydroquinone (TMQ); compounds containing sulfur and phosphorus, for example metal dithiophosphates, e.g. zinc dithiophosphates (ZnDTP), "OOS triesters" i.e. reaction products of dithiophosphoric acid with activated double bonds from olefins, cyclopentadiene, norbornadiene, α-pinene, polybutene, acrylic esters, maleic esters (ashless on combustion); organosulfur compounds, for example dialkyl sulfides, diaryl sulfides, polysulfides, modified thiols, thiophene derivatives, xanthates, thioglycols, thioaldehydes, sulfur-containing carboxylic acids; heterocyclic sulfur/nitrogen compounds, especially dialkyldimercaptothiadiazoles, 2-mercaptobenzimidazoles; zinc and methylene bis(dialkyldithiocarbamate); organophosphorus compounds, for example triaryl and trialkyl phosphites; organocopper compounds and overbased calcium and magnesium-based phenolates and salicylates.

The preferred antiwear (AW) and extreme pressure (EP) additives include phosphorus compounds, for example trialkyl phosphates, triaryl phosphates, e.g. tricresyl phosphate, amine-neutralized mono and dialkyl phosphates, ethoxylated mono and dialkyl phosphates, phosphites, phosphonates, phosphines; compounds containing sulfur and phosphorus, for example metal dithiophosphates, e.g. zinc $C_{3-12}$-dialkyldithiophosphates (ZnDTPs), ammonium dialkyldithiophosphates, antimony dialkyldithiophosphates, molybdenum dialkyldithiophos-phates, lead dialkyldithiophosphates, "OOS triesters" i.e. reaction products of dithiophosphoric acid with activated double bonds from olefins, cyclopentadiene, norbornadiene, alpha-pinene, polybutene, acrylic esters, maleic esters, triphenylphosphorothionate (TPPT); compounds containing sulfur and nitrogen, for example zinc bis(amyl dithiocarbamate) or methylenebis(di-n-butyl dithiocarbamate); sulfur compounds containing elemental sulfur and $H_2S$-sulfurized hydrocarbons (diisobutylene, terpene); sulfurized glycerides and fatty acid esters; overbased sulfonates; chlorine compounds or solids such as graphite or molybdenum disulfide.

A further preferred group of additives is that of friction modifiers. The friction modifiers used may include mechanically active compounds, for example molybdenum disulfide, graphite (including fluorinated graphite), poly(trifluoroethylene), polyamide, polyimide; compounds which form adsorption layers, for example long-chain carboxylic acids, fatty acid esters, ethers, alcohols, amines, amides, imides; compounds which form layers through tribochemical reactions, for example saturated fatty acids, phosphoric acid and thiophosphoric esters, xanthogenates, sulfurized fatty acids; compounds which form polymer-like layers, for example ethoxylated dicarboxylic acid partial esters, dialkyl phthalates, methacrylates, unsaturated fatty acids, sulfurized olefins or organometallic compounds, for example molybdenum compounds (molybdenum dithiophosphates and molybdenum dithiocarbamates MoDTC) and their combinations with ZnDTPs, copper-containing organic compounds.

Some of the additives detailed above may fulfill multiple functions. ZnDTP, for example, is primarily an antiwear additive and extreme pressure additive, but also has the character of an antioxidant and corrosion inhibitor (here: metal passivator/deactivator).

The additives detailed above are described in more detail inter alia in T. Mang, W. Dresel (eds.): "Lubricants and Lubrication", Wiley-VCH, Weinheim 2001; J. Bartz: "Additive für Schmierstoffe", Expert-Verlag, Renningen-Malmsheim 1994; R. M. Mortier, S. T. Orszulik (eds.): "Chemistry and Technology of Lubricants", Blackie Academic & Professional, London, 2nd ed. 1997, The entire of these documents is incorporated herein by reference.

Preferred lubricant oil compositions have a viscosity, measured at 40° C. to ASTM D 445, in the range of 10 to 120 $mm^2/s$, more preferably in the range of 20 to 100 $mm^2/s$. In order to achieve an optimal engine protection, the kinematic viscosity KV100 of the lubricant oil compositions is preferably at least 5.0 $mm^2/s$, more preferably at least 7.0 $mm^2/s$, even more preferably at least 8.0 $mm^2/s$ and most preferably at least 10.0 $mm^2/s$.

In a particular aspect of the present invention, preferred lubricant oil compositions have a viscosity index (VI) determined to ASTM D 2270 in the range of from 100 to 500, more preferably in the range of from 150 to 400 and most preferably in the range of from 200 to 350.

Appropriate lubricant oil compositions have a PSSI to DIN 51350-6 (20 h, tapered roller bearing) less than or equal to 100. The PSSI is more preferably less than or equal to 65, especially preferably less than or equal to 25.

The present lubricant oil compositions can be used especially as a motor oil for an internal combustion engine, e.g. a petrol or a diesel engine or hydraulic oil.

Accordingly, one aspect of the present invention is related to an internal combustion engine comprising the lubricant composition as described above. A further aspect of the present invention is related to a hydraulic system which comprises a hydraulic fluid of the present invention.

EXAMPLES

Materials.

Cyclooctene (95%), cis-4-octene (97%), butyl- and lauryl methyl methacrylate were purchased from commercial sources and purified by vacuum distillation, if necessary. Group III base oil NexBase® 3043 manufactured by Neste Oil N. V., Belgium was used for the preparation of lubricant compositions. NexBase® 3043 is a colorless, catalytically hydroisomerized and dewaxed base oil having density of 0.831 g/ml and comprising hydrogenated, highly isoparaffinic hydrocarbons.

Polymer Characterization.

$^1$H-NMR spectra of the monomers and polymers were recorded on Bruker AV500 and HD500 spectrometers in deuterated chloroform ($CDCl_3$). The chemical shifts are given compared to the solvent peak at 7.26 ppm as internal standards. Molar masses and dispersity (Đ) of the polymers were obtained by SEC on an Agilent 1100 series equipped with three PLgel 5 µm Mixed-C columns and a refractive index detector (HewlettPackard 1047A) at 35° C. Chloroform ($CHCl_3$) was employed as the mobile phase at a flow rate of 1 mL/min, and the samples were prepared at the concentration of 1 mg/mL in $CHCl_3$. The system was calibrated by polystyrene standards. Thermogravimetric analysis (TGA) was performed on a TA Instruments Q500 under a nitrogen flow of 20 mL/min. 10-15 mg of samples was heated at a heating rate of 10° C./min from 20 to 380° C. Samples were heated at a rate of 20° C./min to the desired temperature in isothermal experiments, and then maintained at constant temperature for six hours.

The viscosity data presented in Tables 3-5 were obtained as follows: the temperature dependent viscosity of the polymer-thickened base oil were measured by a TA Instrument AR-G2 rheometer with concentric cylinders geometry equipped with Peltier temperature controller in series with a water-bath. The outer cylinder was loaded with ca. 12 mL of oil solution of the polymeric additives, and the gap between outer and inner conical cylinders was set to 2000 µM. Frequency was swept between $1 \leq \omega \leq 100$ rad/s in a rotational mode at chosen temperatures in the range of 0 to 140° C.

The obtained dynamic viscosity data were converted to kinematic viscosity (KV) by dividing the values by the density of the polymer solution. The density of the dilute polymer-lubricant mixture was assumed to be equal to that of the base oil (0.831 g/mL).

The kinematic viscosities at 40 and 100° C. were used to obtain the viscosity index (VI) values according to ASTM 2270.

Example 1: Synthesis of Graft Copolymers P1-P10

Graft copolymers P1-P10 of the present invention where synthesized according to the procedure shown in Scheme 2:

Scheme 2: Successive ROMP, ATRP, and hydrogenation to prepare graft copolymers P1-P10.

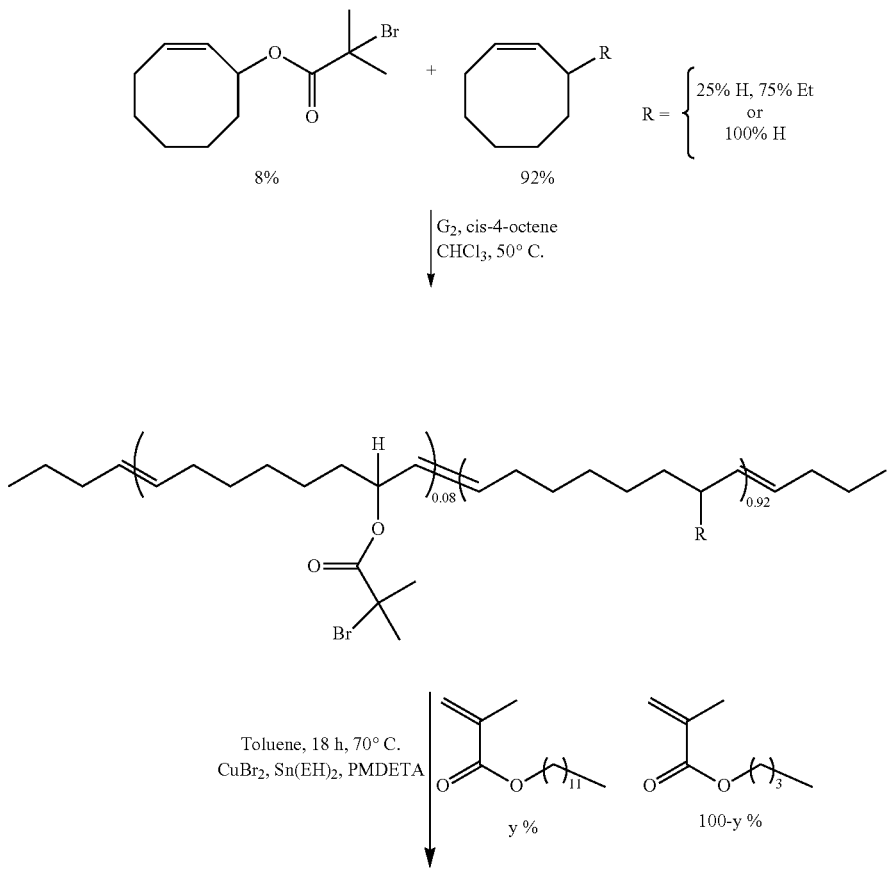

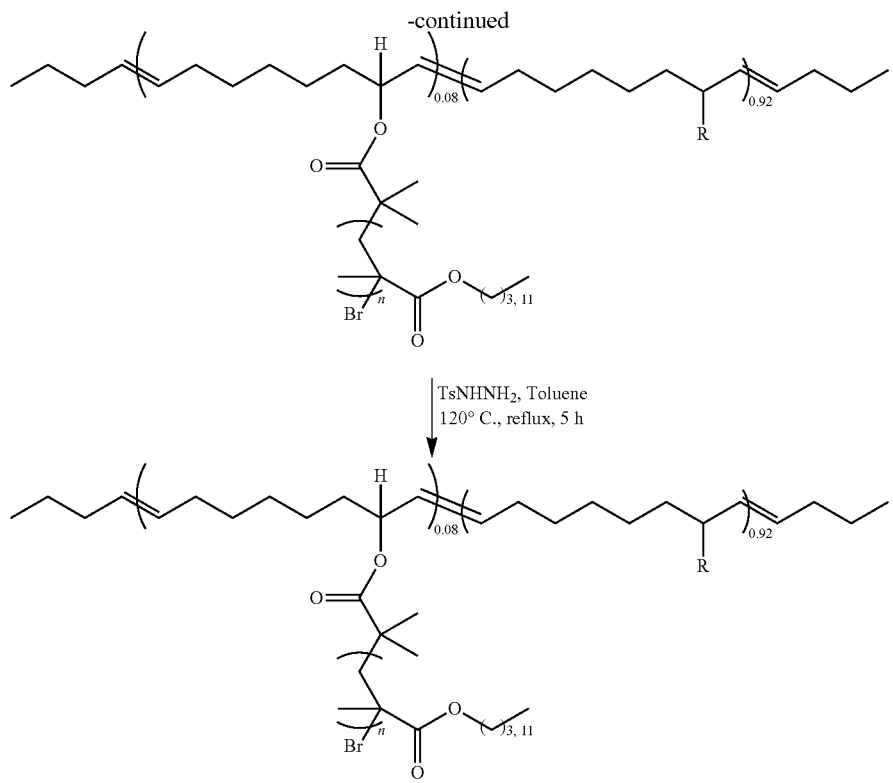

Step (a)

The synthesis of the polymer A was carried out according to the procedure of Y. Xu et al. (Macromolecules, 2012, 45, 9604-9610).

Solution of cis-cyclooctene (COE), 3-ethyl-COE, and α-bromoisobutyrate functionalized cis-cyclooctene (BrI-COE) were used as the monomer mixture in CHCl$_3$ (1M). The monomer solution was degassed by three cycles of freeze-pump thaw, and a solution of (1,3-Bis(2,4,6-trimethylphenyl)-2-imidazolidinylidene)dichloro(phenylmethylene)(tricyclohexylphosphine)ruthenium (Grubbs second generation catalyst, G2) in 0.2 mL dry CHCl$_3$ was transferred to the reaction flask using a syringe. The appropriate amount of cis-4-octene as the chain transfer agent (CTA) was then added to the reaction mixture with the final molar ratio [monomer]:[CTA]:[G2] of 4 000:30:1. The reaction was allowed to stir at 50° C. for 18 h before quenching by 0.1 mL ethyl vinyl ether at room temperature. The polymer was precipitated from cold methanol and dried in vacuo.

The polymer A obtained in the step (a) contained 8 mol % functional monomers as initiating sites, corresponding to one side chain per 100 carbon atom of the polyolefin backbone in the resulting graft copolymers of the present invention.

Step (b)

In a three-necked flask, a solution of polyolefin precursor (PO—Br), butyl methacrylate (BuMA), lauryl methacrylate (LMA), Tin(II) 2-ethylhexanoate (Sn(EH)$_2$), and N,N,N',N",N"-pentamethyldiethylene-triamine (PMDETA) was degassed thoroughly by argon bubbling for 30 minutes prior to adding CuBr$_2$. The final molar ratio of the reactant [monomer]:[PO—Br]:[CuBr$_2$]:[Sn(EH)$_2$]:[PMDETA] was 2000:1:0.1:0.5:0.1 in the activator regenerated by electron transfer (ARGET) atom transfer radical polymerization (ATRP). The reaction mixture was stirred at 70° C. for 16 hours before cooling in ice bath and opening to air. The polymer was precipitated from methanol, dried, dissolved in chloroform and passed through a basic alumina column to remove colorful residual copper catalyst. Final polymer B was obtained by another precipitation from large excess of methanol and drying overnight in vacuo.

Hence, successive ROMP and ARGET ATRP was performed to graft alkyl methacrylates on polyolefin backbone. The ATRP macro-initiators were synthesized from the ROMP of α-bromoisobutyrate functionalized cis-cyclooctene (3-BrI-COE), cis-cyclooctene (COE), and 3-ethyl-COE (EtCOE). Two ATRP macro-initiators were prepared with 8% of BrICOE and [COE]:[EtCOE] molar ratio of 100:0 and 25:75 to study the influence of crystallinity of the backbone on the performance of the polymeric additive.

The authors found that hydrogenation of the ROMP synthesized polymer precursor results in a thermal degradation and inversely affects the ATRP initiating sites. In the method of the present invention, the initiators for ATRP rely on propagating methacrylates on the polyolefin precursor prior to hydrogenation reaction (cf. Schemes 1 and 2). The alkyl groups of the methacrylate-based monomer are of particular importance for the performance of the final polymer as viscosity modifier. The shorter alkyl chains (C3-C7) determine the coil size of the polymer molecules at low temperature, while the intermediate chains (C8-C14) are relevant for oil solubility.

In the step (b) a reducing agent (here, Sn(EH)$_2$) constantly regenerated the ATRP activator, Cu(I), from oxidatively stable Cu(II) bromide. Therefore, polymerization reaction was conducted with no addition of air-sensitive Cu(I), thus without rigorous deoxygenation, and oxygen was only initially removed by 30 minutes of argon bubbling. In addition, we found that even a few ppm of CuBr$_2$ was sufficient for a successful ATRP in the presence of reducing agent. Therefore, the reactants molar ratio in our work [monomer]:[PO—Br]:[CuBr$_2$]:[Sn(EH)$_2$]:[PMDETA] was chosen to be 2000:1:0.1:0.5:0.1, in which the amount of Cu-based catalysts was reduced to ca. 10 wt. % of the catalyst used in normal ATRP. Both simple equipment and low catalyst concentrations are particularly advantageous for the process, especially if carried on an industrial scale.

Above steps (a) and (b) were carried out to prepare two different polymers B, the molecular composition of which is shown in Table 1 below. After isolation, the polymers B were employed as macroinitiators in the subsequent step (c).

TABLE 1

Composition of poly(COE$_x$-stat-EtCOE$_y$-stat-BrICOE$_{0.08}$) copolymers

| Macroinitiator 1 | | | Macroinitiator 2 | | |
|---|---|---|---|---|---|
| $M_n^a$ (kDa) | Đ$^a$ | [COE]:[EtCOE]:[BrICOE]$^b$ | $M_n^a$ (kDa) | Đ$^a$ | [COE]:[EtCOE]:[BrICOE]$^b$ |
| 150 | 1.7 | 24:68:8 | 50 | 1.7 | 92:0:8 |

$^a$Determined by SEC.
$^b$Calculated from $^1$H NMR.

In the following, the macroinitiator 1, poly(COE$_{0.24}$-stat-EtCOE$_{0.68}$-stat-BrICOE$_{0.08}$), and the macroinitiator 2, poly(COE$_{0.92}$-stat-BrICOE$_{0.08}$), will be addressed as "CE150" and "C50", respectively.

Step (c)

A mixture of the polymer B obtained in the step (b), p-tosyl hydrazide, tributylamine, and trace amount of BHT was refluxed with toluene for 3 h and allowed to cool down to room temperature. The hydrogenated polymer was recovered by precipitation from large excess of methanol and vacuum dried overnight.

The composition of the obtained graft copolymers P1-P10 is summarized in Table 2.

TABLE 2

Composition of graft copolymers P1-P10

| Graft copolymer | | | Side chain | | | | |
|---|---|---|---|---|---|---|---|
| Co-polymer$^a$ | $M_n^b$ [kDa] | Đ$^b$ | LMA units$^c$ | BuMA units$^c$ | [LMA]:[BuMA]$^c$ | Conv.$^c$ [%] | $M_n^c$ [kDa] |
| P1 | L-CE150 | 215 | 2.2 | 210 | — | 100:0 | 9 | 53 |
| P2 | L-CE150 | 300 | 2.1 | 290 | — | 100:0 | 11 | 74 |
| P3 | L-CE150 | 750 | 2.4 | 760 | — | 100:0 | 29 | 190 |
| P4 | L$_{60}$B$_{40}$-CE150 | 610 | 3.6 | 530 | 330 | 62:38 | 29 | 180 |
| P5 | L$_{40}$B$_{60}$-CE150 | 600 | 2.7 | 480 | 740 | 40:60 | 25 | 230 |
| P6 | L$_{20}$B$_{80}$-CE150 | 780 | 2.4 | 150 | 690 | 18:82 | 22 | 140 |
| P7 | L-C50 | 290 | 2.1 | 260 | — | 100:0 | 46 | 65 |
| P8 | L$_{60}$B$_{40}$-C50 | 260 | 2.1 | 180 | 95 | 65:35 | 50 | 60 |
| P9 | L$_{40}$B$_{60}$-C50 | 660 | 2.2 | 470 | 710 | 39:61 | 24 | 220 |
| P10 | L$_{20}$B$_{80}$-C50 | 520 | 2.1 | 360 | 1530 | 19:81 | 21 | 310 |

$^a$The general formula is poly(COE$_x$-stat-EtCOE$_y$-stat-BrICOE$_{0.08}$)-graft-poly(LMA$_n$-stat-BuMA$_m$), which is abbreviated as L$_n$B$_m$-C50 or L$_n$B$_m$-CE150, where n and m are the rounded molar ratio of LMA and BuMA in the side chain, respectively.
$^b$Determined by SEC.
$M_n^b$ stands for the molecular weight $M_n$ of the entire graft copolymer.
$^c$Calculated from $^1$H-NMR.
$M_n^c$ stands for the total molecular weight $M_n$ of the side chains, calculated on the basis of the number of the methacrylate repeating units.

Example 2: Thickening Efficiency of Graft Copolymers P1-P3

Graft copolymers P1-P3 listed in Table 2 were dissolved in group (III) base oil, Nexbase® 3043, by stirring overnight at 90° C. The resulting lubricant compositions were heated between 0 to 140° C. with the intervals of 20° C. and the kinematic viscosity was measured.

Relative thickening contribution (RTC) is a measure for

VI-performance of the polymer, independent of viscosity & base oil

Thickening efficiency for a certain solvency of base oil, independent of base oil viscosity.

The RTC was calculated according to the following relationship:

$$RTC = \left( \frac{\eta_{formulations,\vartheta} - \eta_{baseoil,\vartheta}}{\eta_{baseoil,\vartheta}} \right) * \frac{1}{\% \text{ polymer}},$$

where η is the determined kinematic viscosity; and % polymer is the amount of dissolved graft copolymer, in weight percent, based on the total weight of the lubricant composition.

The RTC of the copolymers P1-P3 at different temperatures are shown in FIG. 1.

P3 shows an increase of thickening contribution with temperature in the desired range around 100° C. The tested graft copolymers P1-P3 show a high RTC.

To better evaluate the performance of the graft copolymer P3, the content of P3 in the base oil was tailored upon which the kinematic viscosity at 100° C. (KV100) of the resulting lubricant composition ranges from 8.1 to 8.4 cSt. The measured kinematic viscosity (KV) of P3 at different concentrations is shown in FIG. 2 as a function of temperature.

Remarkably, the KV100 of 8.4 cSt was obtained with 0.8 wt. % of this graft copolymer in base oil, which is considerably low, compared to the commercially available polymeric additives.

Graft copolymers P1-P3 were synthesized with different side chain lengths by controlling the conversion of the ARGET ATRP reaction. P1, P2, and P3 graft copolymers contain poly(lauryl methacrylate) side chains grafted on CE150, with the shortest side chains for P1 and the longest for P3. Their measured viscometric properties are summarized in Table 3 and illustrated by FIG. 3. Strong thickening power was observed for all polymeric additives by comparing the KV40 and KV100 of the lubricant blends with those of base oil. Long poly(lauryl methacrylate) chains in P3 led to stronger intermolecular interactions and higher thickening efficiency at 100° C., i.e. lower concentration of P3 was required to achieve the KV100 of 8.4 cSt, compared to P1 and P2. Lower KV40 of the P3 solution appears to be attributed to the fewer polymer chains in oil, which produce greater VI. Additionally, P3 generated higher KV140 than P1 and P2 (see FIG. 4), due to more extended long poly(lauryl methacrylate) chains.

TABLE 3

KV40 and VI for lubricant compositions containing graft copolymers P1-P3 with different side chain length at fixed KV100

| Graft copolymer* | Content [wt. %] | KV40 [cSt] | KV100 [cSt] | Viscosity index |
|---|---|---|---|---|
| Base oil | — | 22 | 4.4 | 109 |
| P1 $L_{210}$-CE150 | 1.3 | 41 | 8.4 | 187 |
| P2 $L_{290}$-CE150 | 1.2 | 40 | 8.4 | 193 |
| P3 $L_{760}$-CE150 | 0.8 | 38 | 8.4 | 207 |

*The subscripted values indicate the number of LMA repeating units, calculated from $^1$H-NMR Three graft copolymers P3, P4, and P5 (Table 2) were prepared from same polyolefin backbone CE150. Their side chains contain LMA and BuMA with various molar ratios of BuMA from 0 to 60%. The KV of lubricant compositions comprising P3-P5 is plotted versus temperature in FIG. 4 and summarized in Table 4 to illustrate the significance of the side chain polarity for the lubricant performance. Polymer concentration in the base oil was again selected in a way that the formulated lubricant composition exhibited the KV100 in the range of 8.1 to 8.4 cSt.

Although P4 comprises more polar side chains, P3 was apparently more efficient in thickening at higher temperature and showed the KV100 of 8.4 cSt at lower concentration than P4 (0.8 wt. % for P3 vs. 1.0 wt. % for P4). This could be possibly explained by the presence of more LMA units in P3 side chains consisting of long alkyl group (C12). It appears that longer hydrocarbon groups on the repeating units lead to the coil expansion and enhanced entanglement of the polymer molecule, which become a more important factor than the polarity of the side chain. Moreover, a complete dissolution of BuMA at high temperature renders its polarity influence on intermolecular interaction, resulting in a lower efficiency of P4. However, P5 produces the KV100 of 8.1 at similar concentration as P3, 0.7 wt. %. It may be associated with the large number of BuMA together with LMA units in the side chains, which imitate the performance of the LMA units in P3. On the other hand, P3, P4, and P5 behaved differently at low temperatures (0° C., cf. inset graph in FIG. 4). The KVO decreased as the polarity of the side chain increased. Therefore, the VI significantly increases as the BuMA molar ratio increases up to 60% (Table 4), above which the graft copolymer becomes insoluble in base oil at room temperature. The improved VI may be attributed to the formation of globular conformation, which is more favorable in the presence of oil-immiscible BuMA moieties at lower temperatures. This observation seems to confirm that the side chain polarity influence the low temperature properties, and the molar mass of the side chain assist the high temperature performance of the graft copolymer.

TABLE 4

KV40 and VI for lubricants formulated with graft copolymers with different polarity of the pendant chains

| Graft copolymer | Content [wt. %] | KV40 [cSt] | KV100 [cSt] | Viscosity index |
|---|---|---|---|---|
| P3 $L_{760}$-CE150* | 0.8 | 38 | 8.4 | 207 |
| P4 $L_{60}B_{40}$-CE150 | 1.0 | 37 | 8.4 | 214 |
| P5 $L_{40}B_{60}$-CE150 | 0.7 | 34 | 8.1 | 225 |

*The subscripted value indicates the number of LMA repeating units, calculated from $^1$H-NMR P7-P10 (cf. Table 2) were prepared by grafting various molar ratios of butyl- and lauryl methacrylate on the polyolefin backbone made from COE and BrlCOE, C50. P7, P8, and P9 were formulated in base oil for viscometric measurements. The measured results are illustrated by FIG. 5 for selected treat rates at which KV100 is between 8.1 to 8.4 cSt.

Viscometric behavior of P7 and P8 with comparable side chain length revealed that the performance of the polymeric additive was not affected by incorporating up to 40% BuMA in the side chains grafted to C50. However, P9 with longer and more polar pendant chains of 60% BuMA and 40% LMA decreased the temperature dependence of the viscosity and produced higher VI (Table 5).

Finally, there were studied the properties of P5 and P9 with similar side chain length and composition (Table 2) in a greater detail. For the sake of clarity, the chemical structures of the graft copolymers P5 and P9 are shown below:

P5:

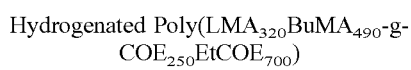

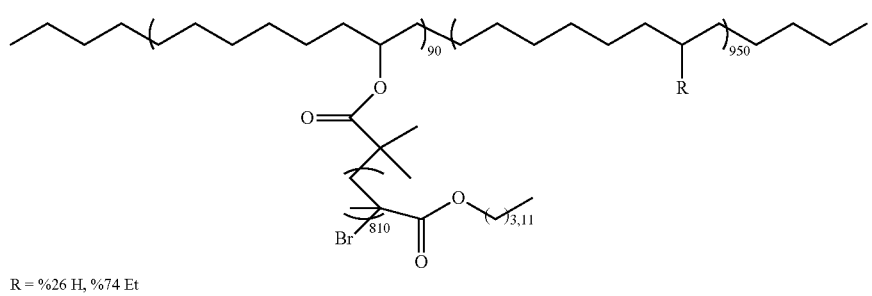

R = %26 H, %74 Et where LMA, BuMA, COE and EtCOE represent lauryl methacrylate, butyl methacrylate, cyclooctene, and ethyl cyclooctene, respectively. The values m formula are calculated by $^1$H-NMR spectroscopy, indicating the number of repeating units in the polymer chain.

P9:

Hydrogenated Poly(LMA$_{280}$BuMA$_{440}$-g-COE$_{340}$)

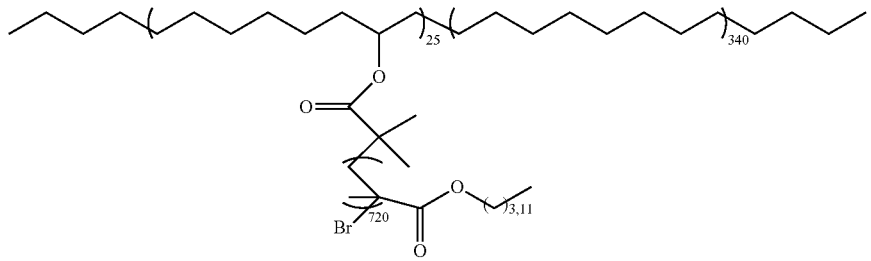

The backbone of P5, CE150, has higher molar mass comparing to P9, but VI of the P9-modified lubricant composition is slightly higher than of the P5-modified one. This appears to indicate that increased crystallinity of the P9 backbone induces stronger intermolecular interaction at elevated temperatures and triggers improved VI, despite its smaller molar mass.

TABLE 5

KV40 and VI for lubricant compositions formulated with graft copolymers P7-P9 having a crystalline backbone and different side chains polarity

| Graft copolymer | | Content [wt. %] | KV40 [cSt] | KV100 [cSt] | Viscosity index |
|---|---|---|---|---|---|
| P7 | L-C50 | 1.3 | 39 | 8.3 | 196 |
| P8 | L$_{60}$B$_{40}$-C50 | 1.0 | 39 | 8.2 | 192 |
| P9 | L$_{40}$B$_{60}$-C50 | 0.8 | 34 | 8.2 | 229 |

Conclusions

A series of lubricant additives based on graft copolymers with polyolefin backbone and PAMA side chains was synthesized by sequential ROMP of cyclic monomers and ARGET ATRP of butyl- and lauryl methacrylate. Oil soluble polymers were obtained by hydrogenation and examined for their viscometric properties over the temperature range of 0 to 140° C. [LMA]:[BuMA] molar ratio was adjusted to achieve optimum solubility-performance of the graft copolymer and the reaction conversion was altered to achieve the desired molar mass of the side chain. It can be concluded that the higher the side chain polarity is the more effective it becomes within the limit of solubility of the polymer, 60% molar ratio of BuMA. Also, greater VI was observed for the lubricants formulated with graft copolymers with higher molar mass in side chains. It was further shown that crystallinity of the backbone directly influences the viscosity modifying performance of the graft copolymer.

Example 3: Determination of High Temperature High Shear (HTHS) Viscosity

Graft copolymer P3 was dissolved in group (III) base oil, Nexbase® 3043, by stirring overnight at 90° C. The variation in viscosity with shear rate for the lubricant composition comprising 5 wt. % P3 was measured at 40 and 100° C.

The corresponding results are illustrated by FIG. 6.

FIG. 6 shows that nonlinear part of the graph at high shear rates shows a non-Newtonian behavior of the system. This temporary loss in viscosity is attributed to deviation of the polymer chains from random coil configuration and partial loss in chain entanglements at high shear rate. This behavior is fully reversible when the force is removed and polymer chains return to their random conformation.

This results confirm that the graft copolymer of the present invention P3 has an excellent shear stability.

Example 4

Graft copolymers of the present invention P5 and P9 as well as reference examples, a linear OCP and an olefin star copolymer were dissolved in group (III) base oil, Nexbase® 3043, by stirring overnight at 90° C. Subsequently, kinematic viscosity of the resulting lubricant compositions, viscosity index (VI) and HTHS were measured.

Cold Cranking Simulator (CCS) values were determined according to the standard ASTM D5293-92. This test method covers the laboratory determination of apparent viscosity of engine oils by cold cranking simulator (CCS) at temperatures between −5 and −35° C. at shear stresses of approximately 50 000 to 100 000 Pa and shear rates of approximately 105 to 104 s$^{-1}$ and viscosities of approximately 500 to 25 000 mPas. The CCS has demonstrated excellent correlation with engine cranking data a low temperatures. The SAE J300 viscosity classification specifies the low temperature viscometric performance of motor oils by CCS limits and MRV requirements. As indicated by its name, this method simulates the viscous drag in an engine during cranking. The lower the viscosity, the higher the speed at which the crankshaft will rotate and the more likely the engine will start.

Kinematic viscosities KV40 and KV100 were measured according to ASTM 445.

Viscosity index was determined in agreement with the norm ASTM 2270.

HTHS at 100° C. and 150° C. were measured in accordance with CEC L-036.

Finally, CCS-35° C. was measured using cold cranking simulator (CCS) according to ASTM D5293.

The resulting values are summarized in Table 6 below.

TABLE 6

| Tests | Linear OCP | Olefin Star Polymer | P5 | P9 |
|---|---|---|---|---|
| Treat rate in Gr III oil | 1.1 | 1.2 | 2 | 2 |
| KV100 [mm$^2$/s], ASTM 445 | 8.45 | 9.13 | 11.77 | 11.09 |
| KV40 [mm$^2$/s], ASTM 445 | 44.37 | 38.35 | 45.06 | 36.13 |
| VI, ASTM 2270 | 170 | 232 | 268 | 318 |
| HTHS @ 100° C. [mPa · s] | 5.59 | 5.08 | 4.98 | 4.97 |
| HTHS @ 150° C. [mPa · s] | 2.62 | 2.62 | 2.57 | 2.63 |
| CCS @ −35° C. [mPas] | 4613 | | 3630 | 3551 |

Example 5

Graft copolymers of the present invention P5, P7, P8 and P9 as well as reference examples known from the prior art, a PAMA (Viscoplex® 3-500, commercially available from Evonik) and a linear OCP (Lubrizol® 7077, an olefin copolymer made of ethylene and propylene in a ratio of around 50/50 wt. %, a weight average molecular weight of ~170 000 g/mol based on PMMA standard, a PDI of 2.1), were dissolved in group (III) base oil, Nexbase® 3043, by stirring overnight at 90° C. Subsequently, kinematic viscosity of the resulting lubricant compositions and viscosity index (VI) was determined.

Kinematic viscosities KV40 and KV100 were measured according to ASTM 445.

Viscosity index was determined in agreement with the norm ASTM 2270.

The resulting values are summarized in Table 7 below.

TABLE 7

KV40, KV100 and VI of copolymers P5, P7, P8 and P9 and of Comb, PAMA and linear OCP (comparative examples)

| | Graft copolymer | Content in base oil [wt. %] | KV40 [cSt] | KV100 [cSt] | Viscosity index |
|---|---|---|---|---|---|
| P5 | $L_{40}B_{60}$-C150 | 2.0 | 45.06 | 11.77 | 268 |
| P7 | L-C50 | 2.0 | 38.12 | 8.72 | 219 |
| P8 | $L_{60}B_{40}$-C50 | 2.0 | 32.29 | 8.43 | 258 |
| P9 | $L_{40}B_{60}$-C50 | 2.0 | 36.13 | 11.09 | 318 |
| PAMA | | 2.0 | 25.68 | 5.93 | 189 |
| Linear OCP | | 2.0 | 75.94 | 13.28 | 179 |

As can be noted from Table 7, the copolymers P5, P7, P8 and P9 of the present invention showed sufficiently high viscosities at 100° C. at a given teat rate (2.0% in oil). At the same treat rate, a comparative polyalkylmethacrylate (PAMA) did not thicken that much, which displays a lack of thickening efficiency causing an economically disadvantage by the higher amount of polymer. The linear OCP thickens even more than the polymers P5 to P9 but the KV40 is very high causing a negative impact on fuel economy. In contrast, PAMA provides a very low KV40 but at the same time a too low KV100 having a detrimental effect on engine protection. Thus, the copolymers of the present invention allow an efficient engine protection at typical operating temperatures of combustion engines and a low fuel consumption at lower temperatures.

The only tested copolymer having a comparably high KV100 value was linear OCP. However, KV40 of linear OCP was as high as 75.94 cSt. Therefore, use of linear OCP leads to an increased fuel consumption.

The invention claimed is:

1. A graft copolymer comprising in the backbone at least one segment A and in the side chain at least one segment B, wherein
   the segment A comprises a repeating unit obtainable by ring-opening metathesis polymerization of at least one compound of Formula (I):

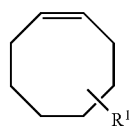

(I)

wherein
$R^1$ is a hydrogen atom or an optionally substituted hydrocarbon group having 1 to 40 carbon atoms, and
at least one atom transfer radical polymerization initiator comprising an optionally substituted cycloalkenyl substituent; and
the segment B comprises repeating units obtainable by atom transfer radical polymerization of at least two compounds of Formula (II):

(II)

wherein the at least two compounds of Formula (II) comprise:
a first compound of Formula (II), wherein $R^2$ is a methyl group and $R^3$ is an alkyl group having 2 to 5 carbon atoms;
a second compound represented by Formula (II), wherein $R^2$ is a methyl group and $R^3$ is an alkyl group having 6 to 15 carbon atoms; and
optionally, a third compound represented by Formula (II), wherein $R^2$ is a methyl group and $R^3$ is an alkyl group having 16 to 20 carbon atoms.

2. The graft copolymer according to claim 1, wherein the molar ratio of the first compound of Formula (II) to the second compound of Formula (II) is in the range from 1:6 to 3:1.

3. The graft copolymer according to claim 1, wherein the segment A comprises repeating units obtainable by ring-opening metathesis polymerization of at least
   a first compound of Formula (I), wherein $R^1$ is a hydrogen atom; and
   a second compound of Formula (I), wherein $R^1$ is an alkyl group having 1 to 20 carbon atoms.

4. The graft copolymer according to claim 3, wherein the molar ratio of the first compound of Formula (I) to the second compound of Formula (I) is in the range from 1:10 to 2:1.

5. The graft copolymer according to claim 1, wherein the segment A has number average molecular weight Mn of from 50,000 g/mol to 300,000 g/mol.

6. The graft copolymer according to claim 1, wherein the graft copolymer has number average molecular weight Mn of from 100,000 g/mol to 1,000,000 g/mol.

7. The graft copolymer according to claim 1, wherein the atom transfer radical polymerization initiator bearing an optionally substituted cycloalkenyl substituent is a compound of Formula (III):

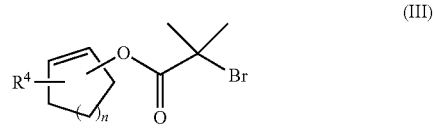

(III)

wherein $R^4$ is a hydrogen atom or an optionally substituted hydrocarbon group having from 1 to 40 carbon atoms and
n is from 1 to 8.

8. The graft copolymer according to claim 7, wherein the graft copolymer is of Formula (IV):

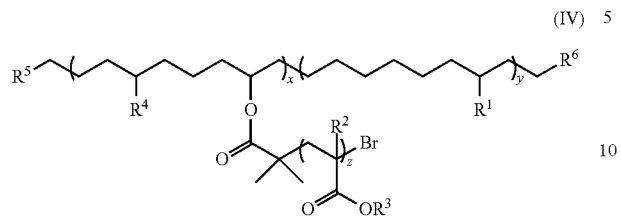

(IV)

wherein
$R^5$ and $R^6$ are independently from each other hydrogen atoms or alkyl groups having 1 to 19 carbon atoms;
x is from 5 to 200;
y is from 100 to 1,500; and
z is from 100 to 1,500.

9. The graft copolymer according to claim 1, wherein
the segment B of the graft copolymer has a total number average molecular weight Mn of from 20,000 g/mol to 1,000,000 g/mol and comprises repeating units derived from butylmethacrylate as the first compound of Formula (II) and laurylmethacrylate as the second compound of Formula (II), wherein the molar ratio of the repeating units derived from butyhlmethacrylate to the molar ratio of the repeating units derived from laurymethacrylate is in the range between 1:2 and 2:1; and
the segment A comprises repeating units obtainable by ring-opening metathesis polymerization of cyclooctene as a first compound of Formula (I) and 3-ethylcyclooctene as a second compound of Formula (I), wherein the molar ratio of the repeating units derived from cyclooctene to the molar ratio of the repeating units derived from 3-ethylcyclooctene is in the range between 1:4 and 1:1.

10. The graft copolymer according to claim 1, wherein
the segment B of the graft copolymer has a total number average molecular weight Mn of from 20,000 g/mol to 1,000,000 g/mol and comprises repeating units derived from butylmethacrylate as the first compound of Formula (II) and laurylmethacrylate as the second compound of Formula (II), wherein the molar ratio of the repeating units derived from butylmethacrylate to the molar ratio of the repeating units derived from laurylmethacrylate is in the range between 1:2 to 2:1; and
the at least segment A comprises repeating units obtainable by ring-opening metathesis polymerization of cyclooctene as the only compound of Formula (I).

11. A process for the manufacturing of the graft copolymer according to claim 1, the process comprising
(a) polymerizing, by ring-opening metathesis polymerization, a mixture comprising at least one compound of Formula (I) and an unsaturated alicyclic compound bearing a halogen atom, thereby obtaining a polymer A;
(b) polymerizing, by atom transfer radical polymerization, the at least two compounds of Formula (II) in the presence of the polymer A obtained in (a), thereby obtaining a polymer B;
(c) hydrogenating the polymer B obtained in (b), thereby obtaining the graft copolymer.

12. A lubricant composition comprising a base oil and at least one graft copolymer according to claim 1.

13. A process, comprising adding the lubricant composition of claim 12, comprising the graft copolymer as an oil additive, in an internal combustion engine.

14. An internal combustion engine comprising the lubricant composition according to claim 12.

15. The graft copolymer according to claim 1, wherein the segment A has a dispersity of from 1.5 to 2.

16. The graft copolymer according to claim 1, wherein the graft copolymer has a dispersity of from 2 to 3.

17. The graft copolymer according to claim 1, wherein the at least two compounds of Formula (II) do not comprise a third compound of Formula (II), wherein $R^2$ is a methyl group and $R^3$ is an alkyl group having 16 to 20 carbon atoms.

18. The lubricant composition of claim 12, wherein the base oil has a viscosity index of from 100 to 180 and wherein the lubricant composition has a viscosity index of from 200 to 500.

19. The lubricant composition of claim 12, wherein a content of the at least one graft copolymer is from 0.01 wt. % to 40 wt. %.

* * * * *

UNITED STATES PATENT AND TRADEMARK OFFICE
CERTIFICATE OF CORRECTION

Page 1 of 2

PATENT NO. : 10,385,288 B1
APPLICATION NO. : 16/300639
DATED : August 20, 2019
INVENTOR(S) : Klaus Schimossek et al.

It is certified that error appears in the above-identified patent and that said Letters Patent is hereby corrected as shown below:

On the Title Page

Item (56), in the Other Publications section, the publication listed is currently as:
"Xu, Y., Thurber, C.M., Lodge, T.P., Hillmyer, M.A., Synthesis and Remarkable Efficacy of Model Polyethylene-graft-poly(methyl methacrylate) COpolymers as Compatibilizers in Polyethylene/ Poly(methyl methacrylate) Blends, Macromolecules, 2012, 45, 9604-9610 (Year: 2012)."
And should be:
--Xu, Y., Thurber, C.M., Lodge, T.P., Hillmyer, M.A., *"Synthesis and Remarkable Efficacy of Model Polyethylene-graft-poly(methyl methacrylate) Copolymers as Compatibilizers in Polyethylene/ Poly(methyl methacrylate) Blends,"* Macromolecules, 2012, 45, 9604-9610 (Year: 2012).--

On the second page, in the Other Publications section, the publications listed are currently as:
"Written Opinion dated Aug. 10, 2017 in PCT/EP2017/061281.
Xu et al., *"Functional Polyolefins: Poly(ethylene)-graft-Poly(tert-butyl acrylate)via Atom Transfer Radical Polymerization From a Polybrominated Alkane"*, Macromolecular Rapid Communications, 2012, 33, 75-79 DOI: 10.1002/marc.201100521.
Xu et al., *"Synthesis and Remarkable Efficacy of Model Polyethylent-graft-poly(methyl methacrylate)Copolymers as Compatibilizers in Polyethylene/Poly(methyl methacrylate)Blends,"* Macromolecules, 2012, 45, 9604-9610 dx.doi.org/10.1021.ma302187b."
And should be:
--Written Opinion dated Aug. 10, 2017 in PCT/EP2017/061281.
Xu et al., *"Functional Polyolefins: Poly(ethylene)-graft-Poly(tert-butyl acrylate) via Atom Transfer Radical Polymerization From a Polybrominated Alkane,"* Macromolecular Rapid Communications, Signed and Sealed this
Eighth Day of October, 2019

Andrei Iancu
*Director of the United States Patent and Trademark Office*

2012, 33, 75-79 DOI: 10.1002/marc.201100521.
Xu et al., *"Synthesis and Remarkable Efficacy of Model Polyethylent-graft-poly(methyl methacrylate) Copolymers as Compatibilizers in Polyethylene/Poly(methyl methacrylate) Blends,"* Macromolecules, 2012, 45, 9604-9610 dx.doi.org/10.1021.ma302187b.--